US011520304B2

(12) United States Patent
Pappas et al.

(10) Patent No.: US 11,520,304 B2
(45) Date of Patent: Dec. 6, 2022

(54) AUTOMATION OF SELF-LIFTING FORKLIFT

(71) Applicants: William B. Pappas, Chargrin Falls, OH (US); Alan D Alford, Novelty, OH (US); Gerardo Orlando, Westlake, OH (US); Himanshu S. Amin, Solon, OH (US)

(72) Inventors: William B. Pappas, Chargrin Falls, OH (US); Alan D Alford, Novelty, OH (US); Gerardo Orlando, Westlake, OH (US); Himanshu S. Amin, Solon, OH (US)

( * ) Notice: Subject to any disclaimer, the term of this patent is extended or adjusted under 35 U.S.C. 154(b) by 0 days.

(21) Appl. No.: 16/839,948

(22) Filed: Apr. 3, 2020

(65) Prior Publication Data
US 2020/0319613 A1   Oct. 8, 2020

Related U.S. Application Data

(60) Provisional application No. 62/829,133, filed on Apr. 4, 2019.

(51) Int. Cl.
*G05B 19/042* (2006.01)

(52) U.S. Cl.
CPC .... *G05B 19/042* (2013.01); *G05B 2219/2641* (2013.01)

(58) Field of Classification Search
CPC .......... G05B 19/042; G05B 2219/2641; G05B 2219/45014; G05B 23/024; G05B 19/0428
USPC .......................................................... 700/56
See application file for complete search history.

(56) References Cited

U.S. PATENT DOCUMENTS

| 4,509,127 | A  | * | 4/1985  | Yuki     | B66F 9/24    |
|           |    |   |         |          | 318/571      |
| 2014/0114530 | A1 | * | 4/2014  | Fitch    | G06F 17/00   |
|           |    |   |         |          | 701/36       |
| 2017/0283171 | A1 | * | 10/2017 | High     | B66F 9/0755  |
| 2019/0080537 | A1 | * | 3/2019  | Pryor    | H04W 12/63   |
| 2019/0082044 | A1 | * | 3/2019  | Melendez | H04M 1/72421 |
| 2019/0135598 | A1 | * | 5/2019  | Agarwal  | G05D 1/0088  |

FOREIGN PATENT DOCUMENTS

| KR | 101774200 B1 | * | 9/2017 | ............ B66F 17/003 |
| WO | WO 92/07746  | * | 5/1992 | ............... B62B 1/08 |

* cited by examiner

*Primary Examiner* — Michael W Choi
(74) *Attorney, Agent, or Firm* — Amin, Turocy & Watson, LLP

(57) ABSTRACT

Techniques are described for facilitating automation of a self-lifting forklift. According to one or more embodiments, a system is provided that can be located on or within a forklift. The system can comprise a lifting system that provides for vertically lifting or lowering the forklift, a power supply, a memory that stores computer readable and executable components, and a processor that executes the computer readable and executable components stored in the memory. The processor can be operably couple to: a plurality of sensors that sense conditions associated with the forklift, a context component that determines context of the forklift, an analysis component that analyzes information from the plurality of sensors and the context component, and a control component that controls the forklift based on an output from the analysis component, wherein the control includes automatically lifting or lowering of the forklift.

20 Claims, 20 Drawing Sheets

AUTOMATION OF SELF-LIFTING FORKLIFT

TECHNICAL FIELD

Embodiments disclosed and claimed herein relate to techniques that facilitate automation of a self-lifting forklift.

BACKGROUND

Forklifts can lift, transport, load and unload heavy materials and are thus essential to any business or industry associated with the transportation of freight. A forklift typically comprises a mast, a carriage and forks among other components. The mast is the part of the forklift that lifts and lowers a load of materials. Forks are long extensions (like arms) that are attached to the carriage which mounts the forks to the mast and serves as a support structure for the forklift. Materials to be transported or loaded are typically placed on a pallet which supports the load and can be lifted and transported after inserting the forks into the pallet. Forklifts are typically equipped with wheels to enable transportation of the pallet and load. Some forklifts are propelled manually by an operator pushing or pulling for the forklift. Others are self-propelled by a motor and driven by an operator. While such features make conventional forklifts very useful, additional tools or devices are required depending on the circumstances. For example, a standard forklift can load a large truck through the back door of the truck's cargo area and transport pallets deep into the truck's cargo area if the truck is positioned next to a loading dock, thus leveling the surface of the loading dock and the bed of the truck's cargo area. If a truck is not positioned next to a loading dock and is not equipped with a lift gate, then the forklift can be used to lift the pallet and then unload it onto the truck, but the forklift cannot transport the pallet within the truck's cargo area. In this example, another device such as a hand pallet jack is required to transport the pallet within the cargo area of the truck to another location within the cargo area away from the door.

The need for two devices to load and then position a pallet of materials within the cargo bay of a truck in this example is removed in some cases by using a self-lifting forklift. A self-lifting forklift can effectively "climb" into the bed of a truck or other elevated surface. Thus, a self-lifting forklift can lift, transport, load and unload pallets with materials like a conventional forklift while also elevating itself to a height of a load placed at an elevated position, like a lift gate. More particularly, as forks of the self-lifting forklift position a load to an elevated plane, the forks are lowered to the elevated plane to serve as a supporting base. The forks of the self-lifting forklift are suitably counterbalanced for weight then to allow it to lift itself up through a vertical train so that the entire forklift can be relocated at the elevated plane. At this point the forklift can now be used to transport the load within the elevated plane, such as the bed of a truck's cargo area, thus providing the ability to accomplish this and other tasks without a second device.

By eliminating the need for a second device, self-lifting forklifts can be useful in many use cases requiring lifting, transporting, loading and unloading materials. However, other than a powered system that provides for vertically lifting or lowering the forklift, conventional self-lifting forklifts such as described in EP0553086B1 require manual operation by a human operator. For example, when operating the motorized system to lift the forks carrying a pallet, the operator must align the lifted pallet to a position just above the truck bed using the lifting controls and determining the ideal alignment position of the pallet with respect to the truck bed based on the operator's eyesight. This process can be slow and tedious as the operator will often have to lower and raise the forks several times to find a suitable position, oftentimes because the load that the forklift is carrying can obscure the operator's vision. Conventional self-lifting forklifts cannot determine weight of a pallet and materials as compared to safety guidelines for the weight of loads associated with the forklift. Also, conventional self-lifting forklifts are not self-propelled, so an operator must push and pull the forklift in order to move and position it. In the freight delivery business, speed, efficiency and safety are the most important considerations. The advantages of a self-lifting forklift can be improved significantly through automation.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products provide automation of a self- lifting forklift.

In one or more embodiments described herein, devices, systems, computer-implemented methods, apparatus and/or computer program products facilitate automation of a self-lifting forklift. In accordance with an embodiment, a system can be located on or within a forklift. The system can comprise a lifting system that provides for vertically lifting or lowering the forklift, a power supply, a memory that stores computer readable and executable components, and a processor that executes the computer readable and executable components stored in the memory. The processor can be operably couple to: a plurality of sensors that sense conditions associated with the forklift, a context component that determines context of the forklift, an analysis component that analyzes information from the plurality of sensors and the context component, and a control component that controls the forklift based on an output from the analysis component, wherein the control includes automatically lifting or lowering of the forklift.

In some implementations, the system further comprises a drive train for self-propelling the forklift.

In some embodiments, elements described in connection with the disclosed systems can be embodied in different forms such as a computer-implemented method, a computer program product, or another form.

DETAILED DESCRIPTION

Figure 1:
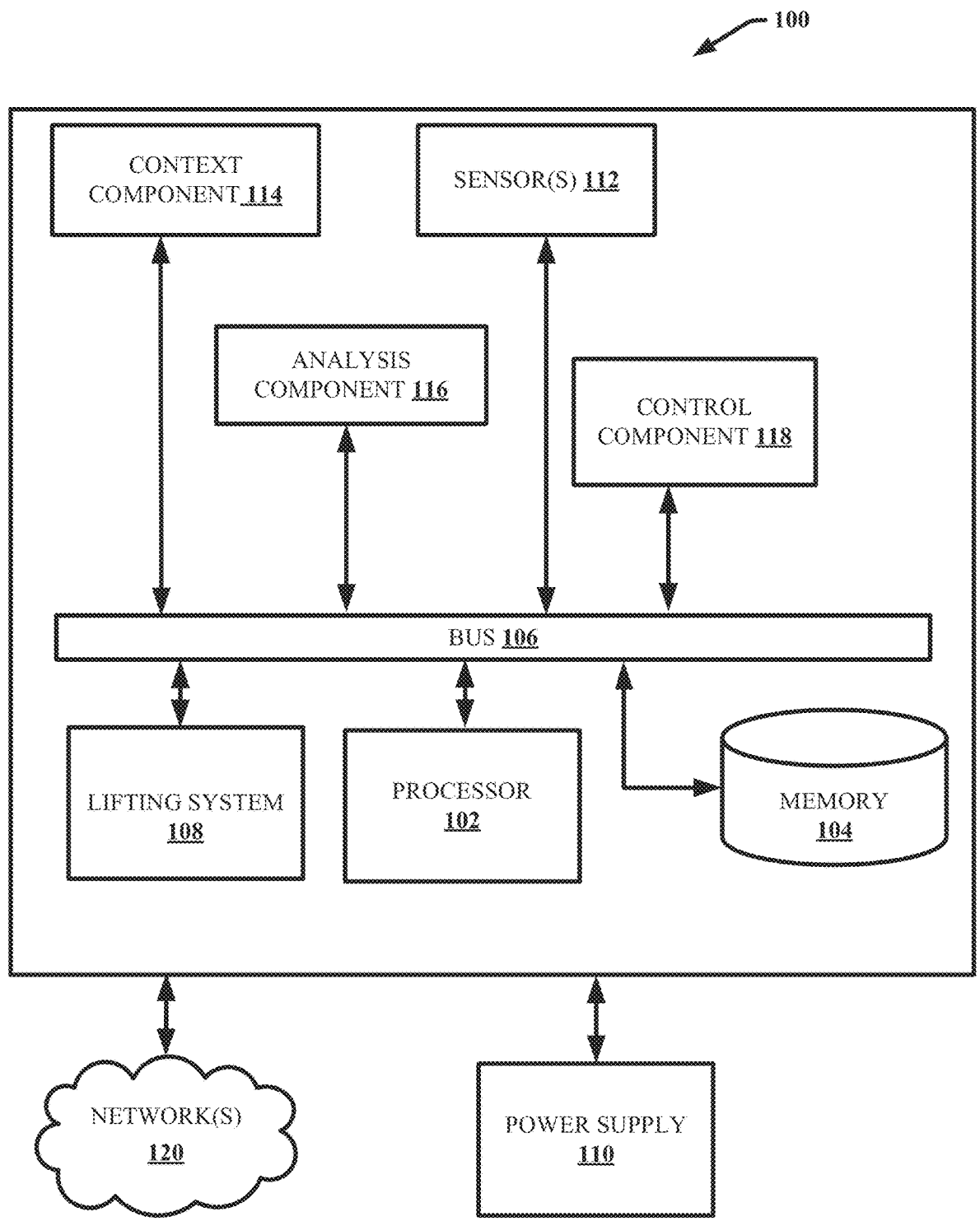
FIG. 1 illustrates a block diagram of an example, non-limiting system that facilitates automation of a self-lifting forklift in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

A self-lifting forklift provides certain advantages over a conventional forklift. A self-lifting forklift can effectively "climb" into the bed of a truck or other elevated surface. Thus, a self-lifting forklift can lift, transport, load and unload pallets with materials like a conventional forklift while also elevating itself to a height of a load placed at an elevated position. More particularly, as forks of the self-lifting forklift position a load to an elevated plane, the forks are lowered to the elevated plane to serve as a supporting base. The forks of the self-lifting forklift are suitably counterbalanced for weight then lifts itself up through a vertical train so that the entire forklift can be relocated at the elevated plane. At this point the forklift can now be used to transport the load within the elevated plane, such as the bed of a truck's cargo area, thus providing the ability to accomplish this and other tasks without a second device.

Self-lifting forklifts can be useful in many use cases requiring lifting, transporting, loading and unloading materials by eliminating the need for a second device such as a lift gate to elevate the load or a hand pallet jack on the bed of a truck after a conventional forklift has loaded a pallet onto the truck bed. However, other than a powered system that provides for vertically lifting or lowering the forklift, conventional self-lifting forklifts require manual operation by a human operator. For example, when operating the motorized system to lift the forks carrying a pallet, the operator must align the lifted pallet to a position just above the truck bed using the lifting controls and determining the ideal alignment position of the pallet with respect to the truck bed based on the operator's eyesight. This process can be slow and tedious as the operator will often have to lower and raise the forks several times to find a suitable position, oftentimes because the load that the forklift is carrying can obscure the operator's vision. Conventional self-lifting forklifts cannot determine weight of a pallet and materials as compared to safety guidelines for the weight of loads associated with the forklift. Also, conventional self-lifting forklifts are not self-propelled, so an operator must push and pull the forklift in order to move and position the forklift. In the freight delivery business, speed, efficiency and safety are the most important considerations. The advantages of a self-lifting forklift can be improved significantly through automation.

In one or more embodiments described herein, systems, computer-implemented methods, and/or computer program products that facilitate automation of a self-lifting forklift are described. By automating one or more functions of a self-lifting forklift, factors such as speed, efficiency and safety can be improved significantly.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates automation of a self-lifting forklift in accordance with one or more embodiments described herein.

In accordance with an embodiment, the system 100 can be located on or within a forklift. More particularly, the system 100 can be embedded within the housing of the forklift or distributed in part within the forklift and externally (e.g., in other equipment, network, or cloud for example). The system can comprise a lifting system 108 that provides for vertically lifting or lowering the forklift, a power supply 110, a memory 104 that stores computer readable and executable components, and a processor 102 that executes the computer readable and executable components stored in the memory. The processor 102 can be operably coupled to: a plurality of sensors 112 that sense conditions associated with the forklift, a context component 114 that determines context of the forklift, an analysis component 116 that analyzes information from the plurality of sensors and the context component, and a control component 118 that controls the forklift based on an output from the analysis component, wherein the control includes automatically lifting or lowering of the forklift.

The system 100 can include a bus 106 that can provide for interconnection of various components of the system 100. It is to be appreciated that in other embodiments one or more system components can communicate wirelessly with other components, through a direct wired connection or integrated on a chipset.

In certain embodiments, a communications component can provide for transmitting and receiving information (e.g., through one or more internal or external networks 120 (wired or wireless networks)).

In certain embodiments, the system 100 can include a lifting system 108 that provides for vertically lifting or lowering the forklift. For example, the lifting system can include one or more of: a hydraulic system, a motorized rail system, a linear motor system, a ball and screw system and the like for vertically lifting or lowering the forklift.

In certain embodiments, the system 100 can include a power supply 110. Embodiments can include various powering options, e.g., fuel-cell version, gasoline, diesel version, propane gas, battery, fully electric, hybrid, or multi-modal power systems.

In an embodiment, the power supply 110 can utilize a 480V charger or a 120V charger or any suitable power source.

In an embodiment, batteries and the power supply 110 are configured for hot-swapping of batteries.

In an embodiment, the power supply 110 can include a mechanical attachment to a vehicle for transport and charging.

In an embodiment, the power supply 110 can enable the forklift to scavenge energy and self-charge while lowering a load by the lifting system 108.

In certain embodiments, the system 100 can include a plurality of sensors 112 that sense conditions associated with the forklift. For example, the sensors 112 can comprise one or more sensors that sense ambient conditions associated with exterior conditions of the forklift (e.g., sensors that detect temperature, pressure, light, image, humidity, pollution, odors, chemicals, smoke, draft, moisture, air quality, particulate, accelerometers, vibration, noise, tone, weight, relative location of other objects, etc.). For example, the sensors 112 can collect information associated with the position of the forklift's forks relative to the bed of a truck where a pallet will be placed. The sensors 112 can also comprise one or more sensors that that can collect information regarding one or more internal components of the forklift (e.g., fuel level, battery charge, condition of brakes, etc.). In another example, the sensors 112 can comprise one or more sensors that collect information associated with one or more operators of the forklift. The sensors 112 can also comprise one or more sensors that can collect information regarding associated equipment such as a vehicle, pickup or delivery location or other forklifts.

In an embodiment, the sensors 112 can also comprise a global positioning system (GPS) component to facilitate location identification, forklift location determination or guidance.

In an embodiment, the sensors 112 can also comprise one or more sensors for determining curves, changes in slope or incline.

In an embodiment, the sensors 112 can also comprise one or more sensors such as machine vision to identify terrain and surface conditions. For example, the sensors 112 can identify when a concrete surface ends and a gravel area begins. In another example, the sensors 112 can identify potholes or cracks in a surface that can impede or disrupt movement of the forklift.

In certain embodiments, the context component 114 can determine context of a forklift. Context of a forklift can include a wide variety of attributes associated with the forklift and the intended use of the forklift at a given time, such as location, time of day, day of the week, calendar date, loading and delivery schedules, identify of forklift operator, status of loading and delivery projects and the like. Context of a forklift can also include extrinsic data that can affect intended use of a forklift at a given time such as weather, traffic, inventory, delivery, loading or unloading delays within a supply chain and the like. For example, the context component 114 can determine or infer context information such as type of load, type of vehicle transporting the load, pallet type, weight, weather, ground conditions, operator skill or experience, height of load, height of forklift, location of the load relative to other objects, etc. Likewise, context information regarding destination of the load and/or vehicle, and/or regarding operational information about the forklift, vehicle and/or pickup or delivery location can be collected and provided to the system 100 for analysis in connection with regulating forklift operation or control.

The context component 114 can, for example, obtain context information from many different sources e.g., an operator or occupant cell phone, calendar, email, appliances, third parties, a vehicle, operating environment, the forklift, etc. In one example, the context component 114 can rely on external systems such as ERP systems, ecommerce platforms, package or freight delivery systems, warehouse schedules, inventory planning systems and the like.

In certain embodiments, the context component 114 can log data associated with identity of one or more operators of a forklift. The context component 114 can, for example, identify and authenticate an operator engaging with the forklift utilizing a variety of sources, e.g., via facial recognition, biometrics, voice recognition, iris recognition, cell phone, keys, or any other suitable means for identification and authentication. In another example, the context component 114 can utilize employment records or other operator records.

In certain embodiments, the analysis component 116 can analyze information from the plurality of sensors 112 and the context component 114. For example, the analysis component 116 can analyze various operational steps required to complete a task or series of tasks utilizing the forklift and performs a utility-based analysis that weighs costs versus benefits associated with respective operational options relative to the required task or tasks. In one example, the analysis component 116 can classify operational options as ideal options, satisfactory options, problematic options or unsafe or prohibited options. In one example, if a required task comprises transporting a pallet with a load to a flatbed truck, the analysis component 116 can determine the range of ideal placements of the forklift relative to the rear of the truck before lifting the pallet with the forklift. Likewise, the analysis component 116 can determine the range of satisfactory placements, problematic placements or unsafe or prohibited placements. Next, as the forklift begins to lift the pallet and the load, the analysis component 116 can determine the range of ideal placements of the pallet relative to the bed of the truck. Likewise, the analysis component 116 can determine the range of satisfactory placements, problematic placements or unsafe or prohibited placements such as lifting the pallet too high or not high enough. In these examples, the determination of the analysis component 116 can be affected by other factors such as weight of the load, weather, surface conditions, delivery vehicle dimensions, surface incline and the like. For example, the analysis component 116 can determine that a particular delivery cannot or should not be made due to an assessment of surface conditions (e.g., too soft, too muddy, too icy, etc.).

In another example, the analysis component 116 can classify route options associated with the route between the pickup spot for a pallet and the loading spot for a pallet, taking into account a variety of factors such as surface conditions, obstacles, inclines, weather, delivery time, delivery priority and the like.

In another example, the analysis component 116 can determine if the weight of a load is suitable for the forklift, the likely delivery route or the delivery vehicle.

In another example, a utility-based analysis can also be employed where the costs of taking a certain action are weighed against the benefits. For example, if floor conditions are not optimal as determined by the analysis component 116 based upon data collected by the sensors 112 and the context component 114, the analysis component 116 may determine or infer that the probability and cost of an accident occurring outweighs the benefit of moving the load over the sub-optimal floor condition.

In an embodiment, the analysis component 116 can build and store in memory 104 forklift operator profiles. An employee of a company that owns a forklift is commonly a frequent user of the forklift, and the analysis component 116 can build a specific model for the operator as well as respective models for other frequent operators as well as types of forklifts. Upon identification by the context component 114 of an operator engaging with the forklift, the analysis component 116 can access specific profiles for each operator of the forklift to generate determinations or inferences regarding operator use and generating recommendations to the control component 118 to adjust the forklift (e.g., display, height, position, etc.) to achieve suitable configuration for operator engagement with the forklift. The context component 114 can log data associated with an operator's operation of the forklift and similar forklifts to continuously update the operator profile utilized by the analysis component 116. It is to be appreciated that when multiple operators are using the forklift, their respective profiles may conflict in certain aspects. The analysis component 116 can utilize the respective profiles and specific operator and forklift models to achieve a happy medium that achieves configuration levels suitable for most or all operators.

In an embodiment, the analysis component 116 can perform self-diagnosis of the forklift and the system 100, schedule maintenance, change battery, send notifications or alerts, etc.

In certain embodiments, the control component 118 can control the forklift based on an output from the analysis component 116, wherein the control includes automatically lifting or lowering of the forklift. For example, the control component 118 can be configured to enable a human operator of the forklift to make certain control and operational decisions associated with the various components of the forklift. Likewise, the control component 118 can be configured to control certain components automatically based upon output by the analysis component 116.

In one example, the control component 118 can provide an alert to the operator of the forklift when operational decisions can be unsafe or create a problem. Likewise, the control component 118 can stop or prevent prohibited actions. For example, the control component 118 can prevent the unloading of a pallet if the forklift is placed too far from the intended unloading spot.

In another example, the control component 118 can regulate one or more forklift components (e.g., hydraulics, brakes, motor, power, controls, sensors 112 (including both environmental and those relating to the forklift and/or load), machine vision, cameras, accelerometers, fluids, displays, interfaces, etc.) based on output from the analysis component 116 to facilitate achieving suitable operation and control of the forklift. Also, the sensors 112 and context component 114 can continually collect data that is analyzed by the analysis component 116, which will generate determinations or inferences regarding forklift operation or control. The control component 118 can continually adjust forklift or other equipment conditions or settings to maintain desired operation of the forklift or ancillary equipment. The system 100 is adaptive and can employ closed or open-looped systems to facilitate maintaining forklift operation or control even as conditions of the forklift operation or control change.

In an embodiment, the control component can activate brakes, e.g., to prevent rolling, tipping, etc., or lock wheels of the forklift.

In an embodiment, the control component 118 can have preset configurations for engagement of the forklift with various types of other equipment (e.g., vehicle type, pallet type, object type (e.g., beer kegs, chemical drums)). For example, the control component 118 can have a preset configuration for ideal lift points for the forklift corresponding to various types of trucks and vehicles, thus eliminating the need for the operator of the forklift to visually align the pallet during the lifting and loading process.

In an embodiment, the forklift can change out wheels to match wheel types to planned use of the forklift.

In an embodiment, the forklift is ruggedized (e.g., weather proofed, large tires, greater lift capacity, hi-capacity batteries, etc.) for military or outdoor applications and the like.

In an embodiment, the forklift comprises tracks instead of or in combination with wheels.

In an embodiment, forks can be swappable, fast swappable, made of different materials (e.g., fiberglass, carbon fiber, steel, iron, composites).

In an embodiment, width of the forks can be adjustable, or the forks can be of alternative configuration, e.g., semi-circular forks for beer barrels or chemical drums.

In an embodiment, the forklift can pick up or drop off loads on an incline, e.g., tilting forks (forward or backwards). The forklift can also determine if the load is appropriately placed on the forks, e.g. the load center is not too far forward so that it could tip.

In an embodiment, the forklift can spin on an axis, allowing for use within confined areas, such as delivery vehicles or narrowly spaced warehouse racks.

Figure 2:
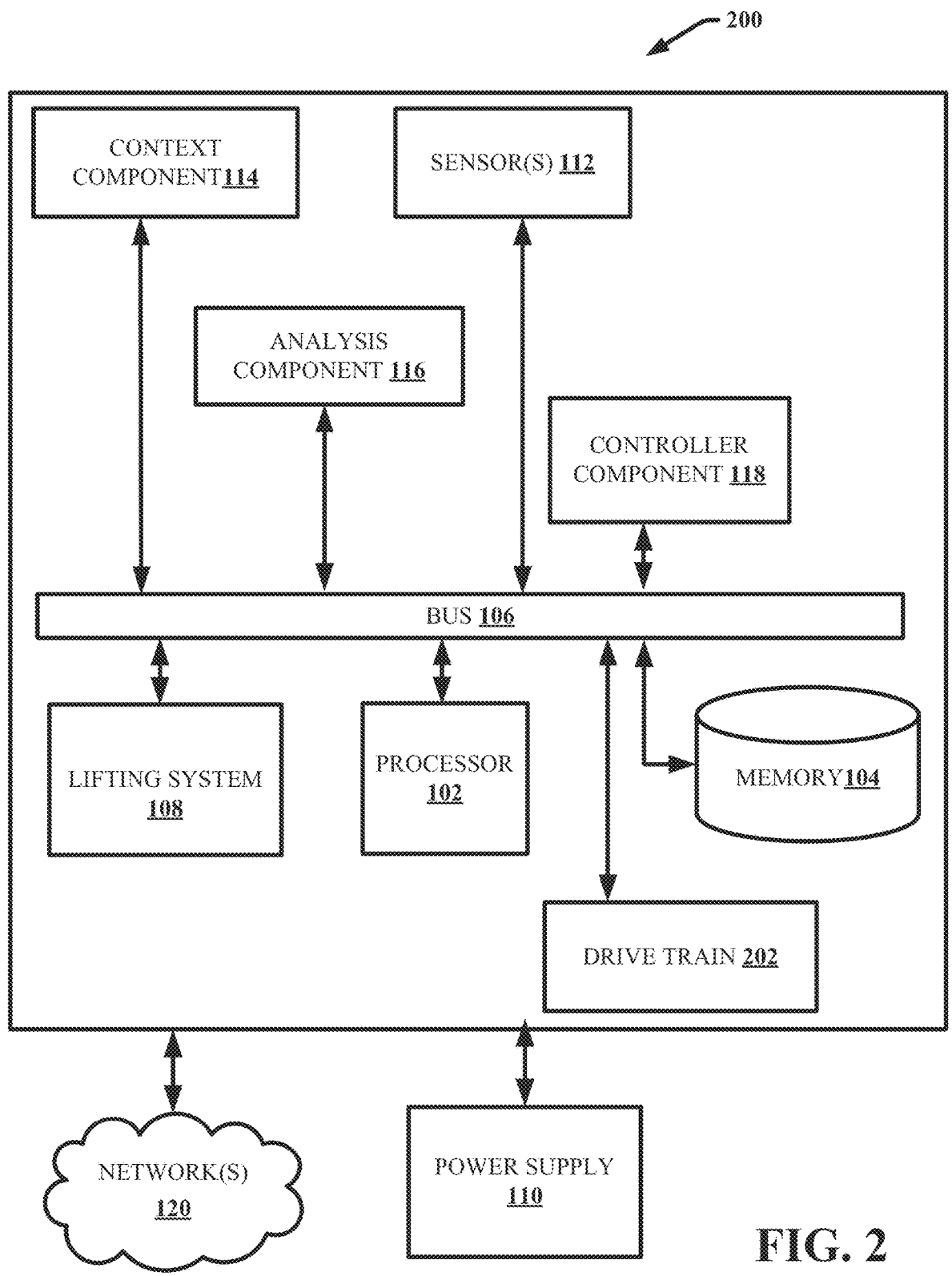
FIG. 2 illustrates a block diagram of another example, non-limiting system that facilitates automation of a self-lifting forklift in accordance with one or more embodiments described herein.

FIG. 2 illustrates a block diagram of another example, non-limiting system that facilitates automation of a self-lifting forklift in accordance with one or more embodiments described herein. Repetitive description of like elements employed in other embodiments described herein is omitted for sake of brevity. In certain embodiments, the system 200 includes a drive train 202 (and associated mechanical, electrical or electro-mechanical components, hardware, software and the like) for self-propelling the forklift. For example, the drive train 202 can utilize systems that provide for autonomous movement of vehicles, carts, robots, drones or the like.

In an embodiment, the forklift is equipped with machine vision to allow for self-navigation and engagement or avoidance of objects. For example, the machine vision can facilitate the forklift self-navigating as well as identifying a load to engage with. The machine vision can facilitate the forklift self-orienting to position forks to insert into pallets, or beneath or around a load and lift, lower and position a palletized or un-palletized load. The machine vision can also enable the forklift to avoid poor surface condition, obstructions and people in order to improve safety.

In another embodiment, cloud-based monitoring and control of the forklift is provided to facilitate remote operation and control of the forklift by a human operator or fully autonomous operation and control of the forklift.

In an embodiment, a fully autonomous or remote-controlled forklift can enter into hazardous areas to move loads and avoid humans from being exposed to the hazardous conditions (e.g., fire, smoke, chemicals, bombs, etc.).

Figure 3:
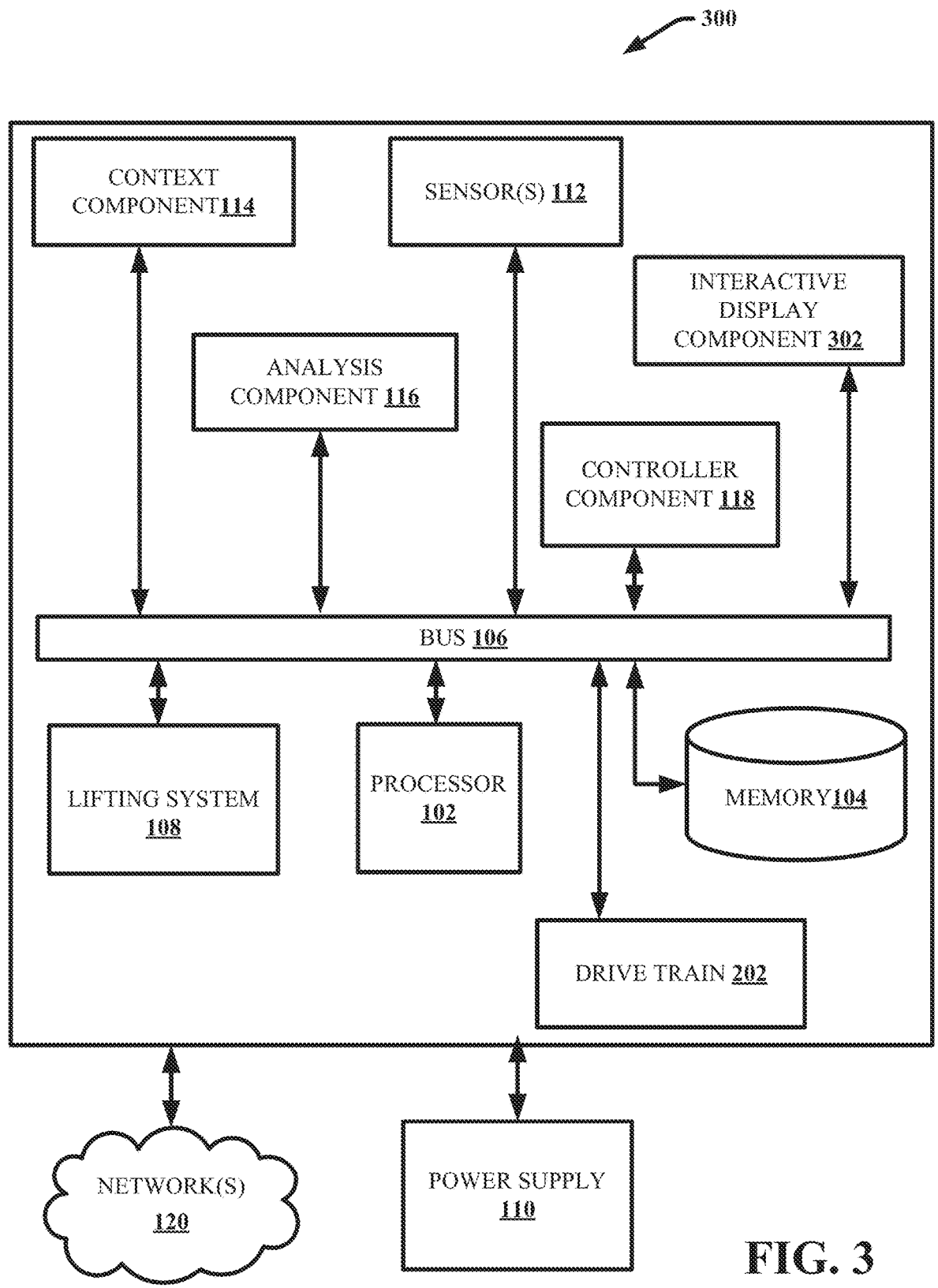
FIG. 3 illustrates a block diagram of yet another example, non-limiting system that facilitates automation of a self-lifting forklift in accordance with one or more embodiments described herein.

FIG. 3 illustrates a block diagram of another example, non-limiting system that facilitates automation of a self-lifting forklift in accordance with one or more embodiments described herein. Repetitive description of like elements employed in other embodiments described herein is omitted for sake of brevity. In certain embodiments, the system 300 includes an interactive display component 302 that can visually represent control of the forklift by the control component 118. For example, the interactive display component 302 can visually display operational controls that enable an operator of the forklift to control operations such as lifting or lowering the forklift and propelling the forklift. In one example, the interactive display component 302 can visually display classifications or recommendations generated by the analysis component 116 associated with one or more control operations. For example, the interactive display component 302 can visually display ideal placement of the forklift or a lifted pallet in relation to the bed of a truck when unloading a pallet. In another example, the interactive display component 302 can visually display warnings of dangerous positioning of the forklift.

In another example, the interactive display component 302 can visually display the ideal path for the operator of the forklift to follow to a delivery point and can identify potential obstructions or other factors that affect a planned route. In another example, the interactive display component 302 can visually display ideal load placements within a truck to ensure that all pallets for a particular delivery can fit in the truck bed.

In an embodiment, if the analysis component 116 determines or infers that an operator of the forklift is fatigued or drowsy, the interactive display component 302 can provide a notification to the operator to not use the forklift and take a break or increase brightness of the display to increase level of alertness of the operator.

In an embodiment, the interactive display component 302 can comprise a remote-control device that communicates with and controls system 300 and one or more forklifts through the wireless network 120.

In certain embodiments, the interactive display component 302 can display visualizations utilizing an augmented reality component or virtual reality component. In one example, the interactive display component 302 can display visualizations utilizing an augmented reality component contained in glasses worn by an operator of a forklift in order to overlay text, color or images onto the operator's field of vision. For example, the interactive display component 302 can overlay arrows onto the ground indicating the route to a delivery point. In another example, obstructions such as potholes or cracks in the pavement can be highlighted in red to alert the operator. In another example, the interactive display component 302 can display visualizations utilizing a virtual reality component contained in a headset worn by an operator of the forklift that simulates the entire field of vision that the operator would see from the perspective of being near the forklift. In this example, the virtual reality component can enable remote operation of the forklift. For example, the virtual reality component can simulate the entire field of vision that an operator would see if the operator was near the forklift, including factors such as space, distance, objects and the like. In addition, the virtual reality component can enhance this view by utilizing overlaid text, color or images to convey useful information to the operator wearing a virtual reality headset. For example, text, color or images can be utilized to convey that an operating surface is wet and possibly slippery, or that the surface inclines or declines in certain areas.

FIGS. 4-10 illustrate a self-lifting forklift that can incorporate non-limiting system 100 (or interchangeably 200 or 300) which can be embedded with housing of the forklift or distributed in part within the forklift and externally (e.g., in other equipment, network, or cloud for example).

Figure 4:
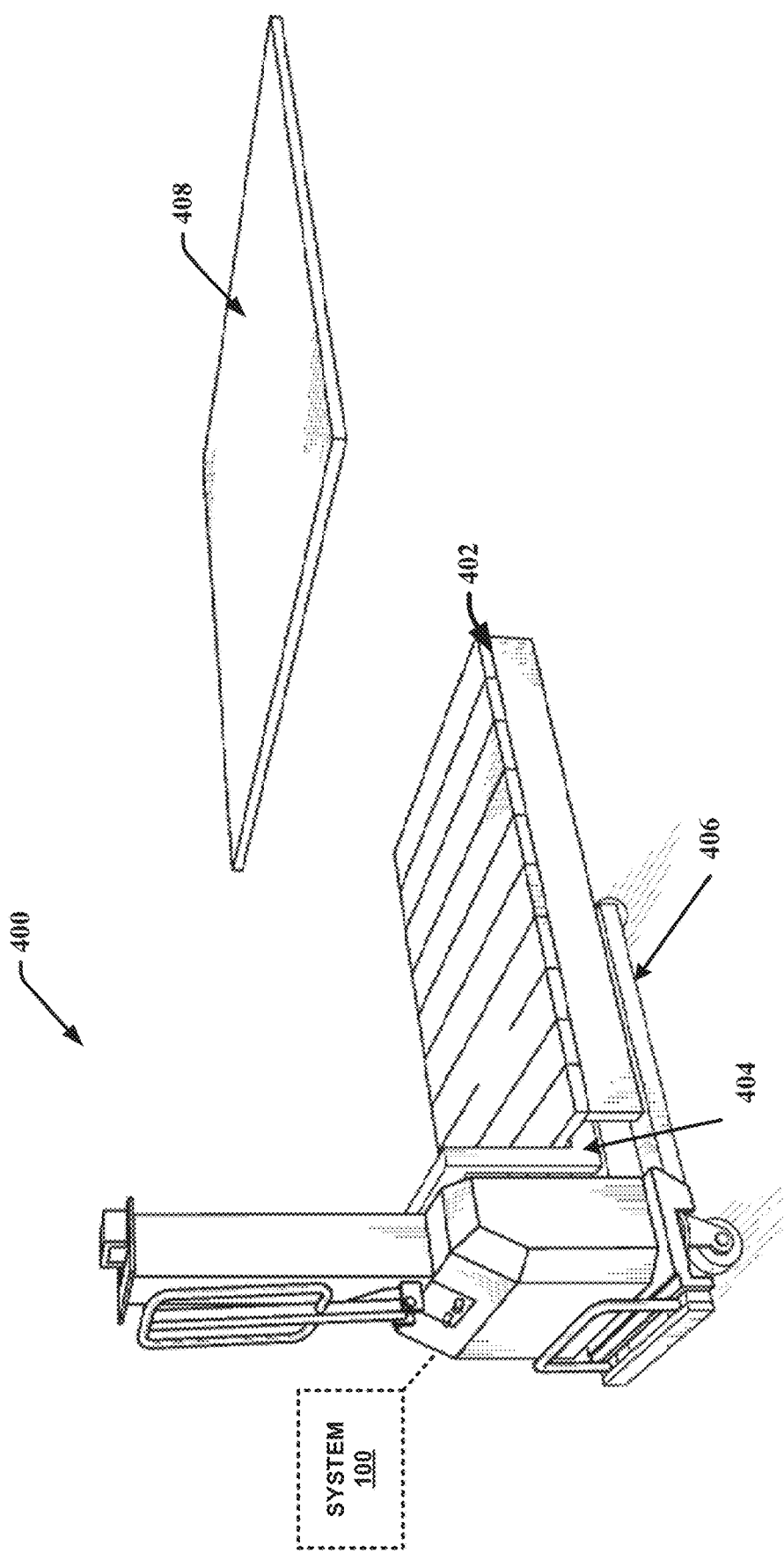
FIG. 4 illustrates an example of a non-limiting system that facilitates automation of a self-lifting forklift in accordance with one or more embodiments described herein.

FIG. 4 illustrates another example of a non-limiting system 100 that facilitates automation of a self-lifting forklift in accordance with one or more embodiments described herein. Repetitive description of like elements employed in other embodiments described herein is omitted for sake of brevity. FIG. 4 depicts a self-lifting forklift 400 with a pallet 402 on its forks 404. The support legs 406 provide support. The forklift 400 can lift and position the pallet 402 to a desired location, e.g., the top of the flatbed 408. The flatbed 408 can represent any surface on which the pallet 402 can be loaded by the forklift 400 (e.g., the bed of a truck, the floor of a van, or a shelf in a storage warehouse for example). In this example, the forklift 400 has been positioned by the system 100 (or 200 or 300) immediately in front of the flatbed 408 to enable loading of the pallet 402 onto the flatbed 408.

Figure 5:
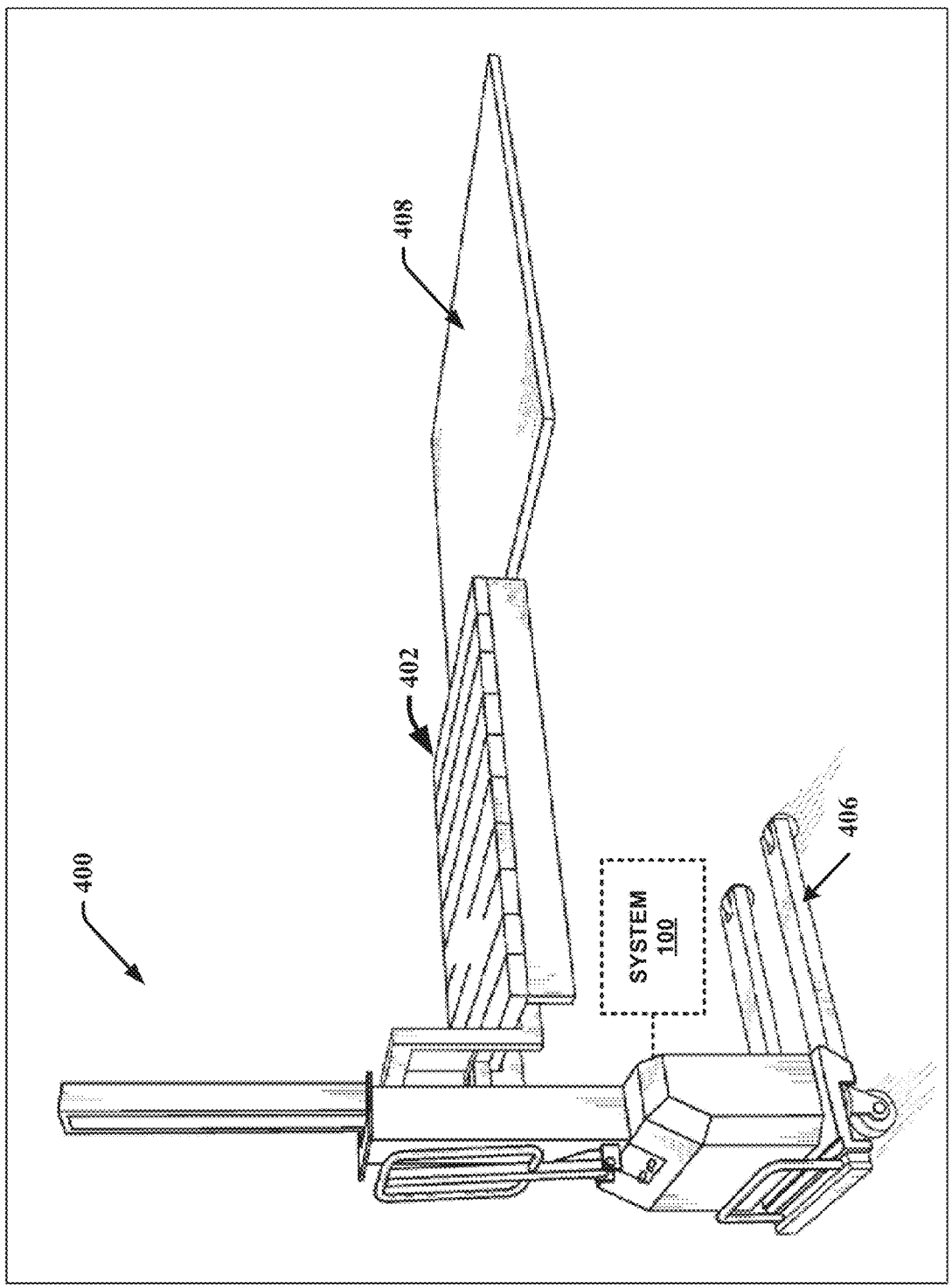
FIG. 5 illustrates another example of a non-limiting system that facilitates automation of a self-lifting forklift in accordance with one or more embodiments described herein.

FIG. 5 illustrates another example of a non-limiting system that facilitates automation of a self-lifting forklift in accordance with one or more embodiments described herein. Repetitive description of like elements employed in other embodiments described herein is omitted for sake of brevity. FIG. 5 illustrates the forklift 400 being controlled by the system 100 (or 200 or 300) to lift the forks 404, which lift the pallet 402 to an elevation coincident with the flatbed 408. The support legs 406 provide support as the pallet 402 is lifted.

Figure 6:
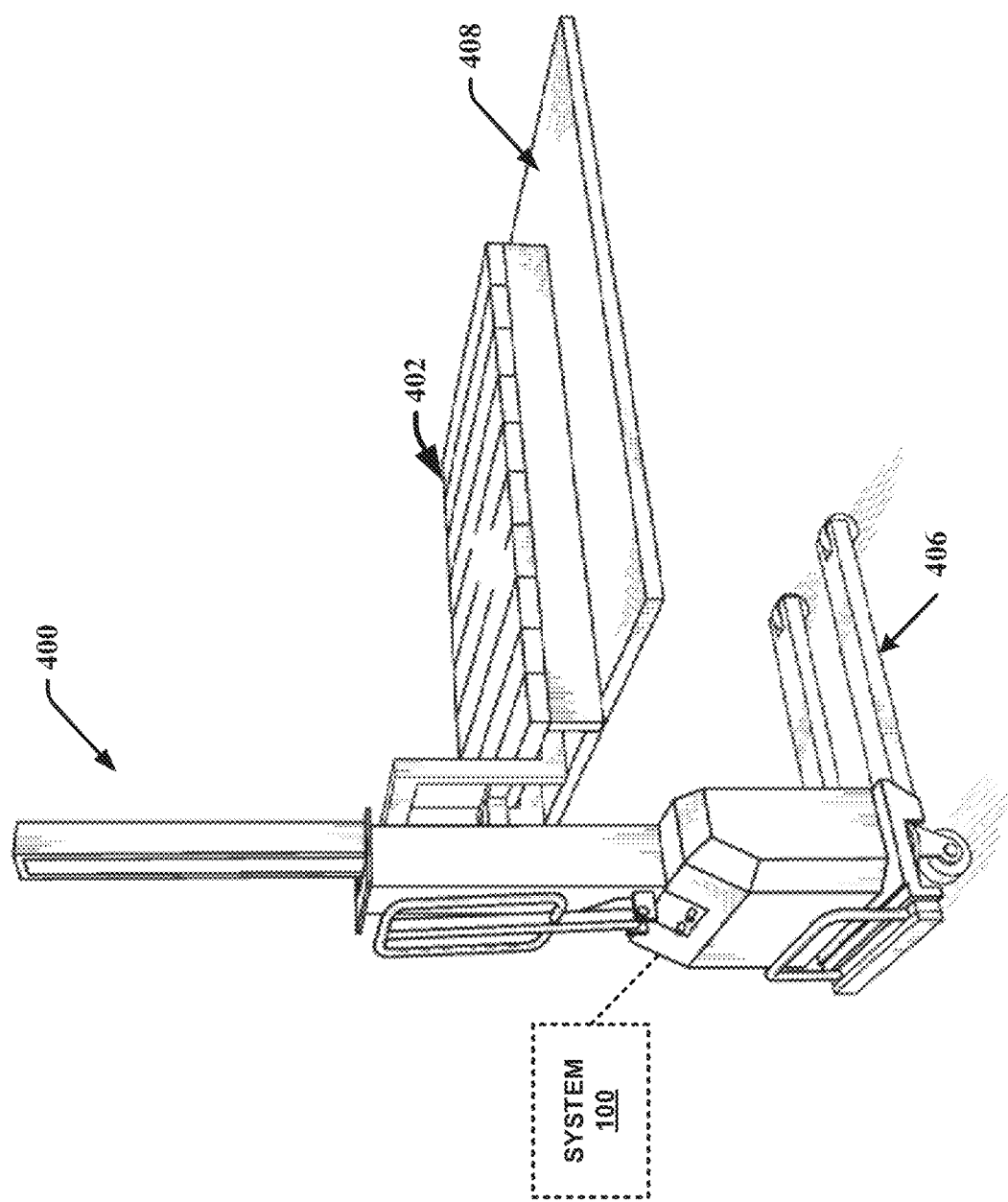
FIG. 6 illustrates yet another example of a non-limiting system that facilitates automation of a self-lifting forklift in accordance with one or more embodiments described herein.

FIG. 6 illustrates another example of a non-limiting system that facilitates automation of a self-lifting forklift in accordance with one or more embodiments described herein. Repetitive description of like elements employed in other embodiments described herein is omitted for sake of brevity. FIG. 6 illustrates the forklift 400 being controlled by the system 100 (or 200 or 300) to move the forklift 400 as well as lifted pallet 402 towards the flatbed 408 so that the pallet 402 can be placed on the surface of the flatbed 406. The support legs 406 remain in position extending out from the front of the forklift 400.

Figure 7:
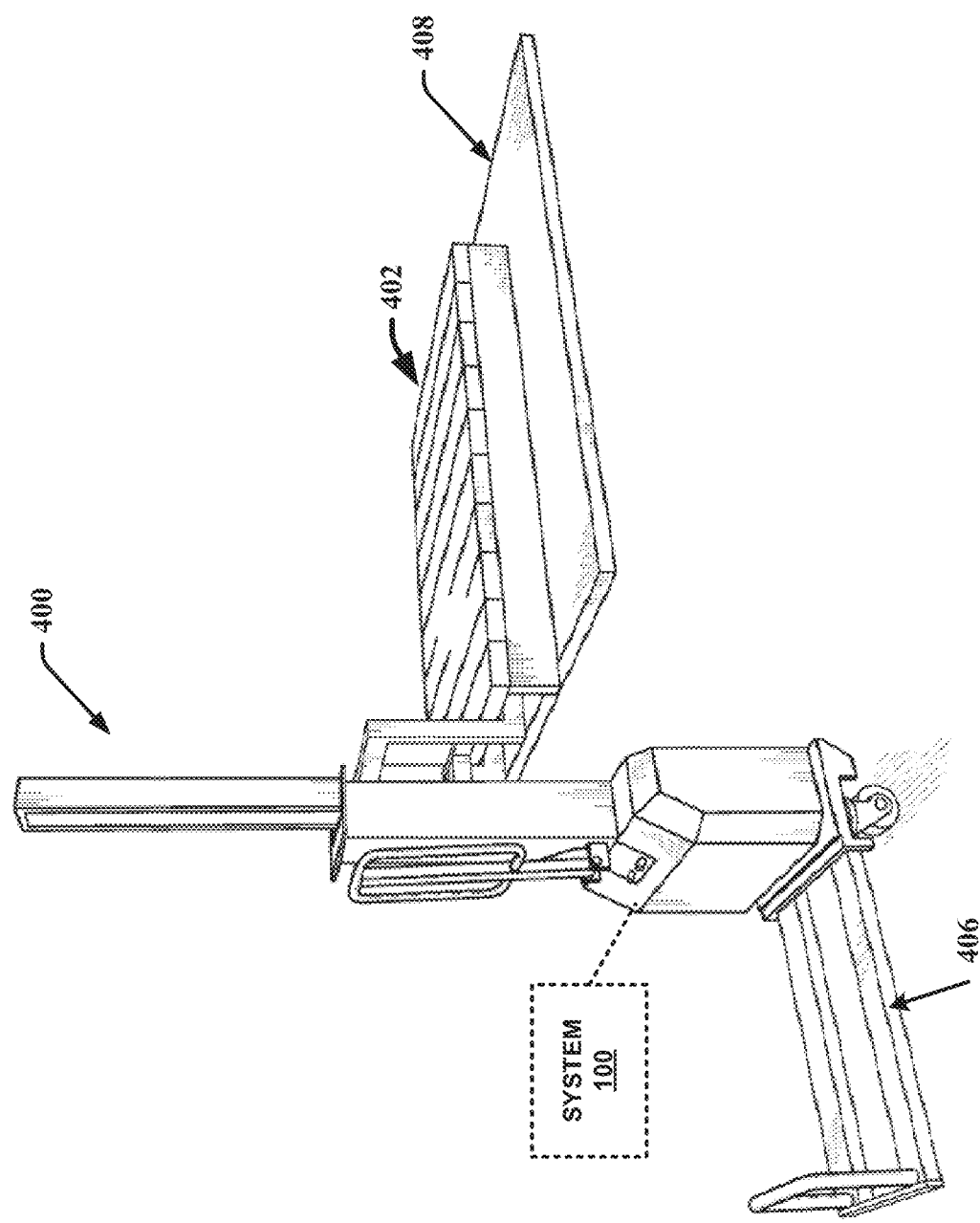
FIG. 7 illustrates yet another example of a non-limiting system that facilitates automation of a self-lifting forklift in accordance with one or more embodiments described herein.

FIG. 7 illustrates another example of a non-limiting system that facilitates automation of a self-lifting forklift in accordance with one or more embodiments described herein. Repetitive description of like elements employed in other embodiments described herein is omitted for sake of brevity. FIG. 7 illustrates the forklift 400 being controlled by the system 100 (or 200 or 300) to place the pallet 402 on the flatbed 408 and to prepare itself for self-lifting by moving the support legs 406 from extending out from the front of the forklift 400 to extending out from the rear of the forklift 400. The support legs 406 act as counterweights or stabilizers in this new position to enable self-lifting of the forklift 400.

Figure 8:
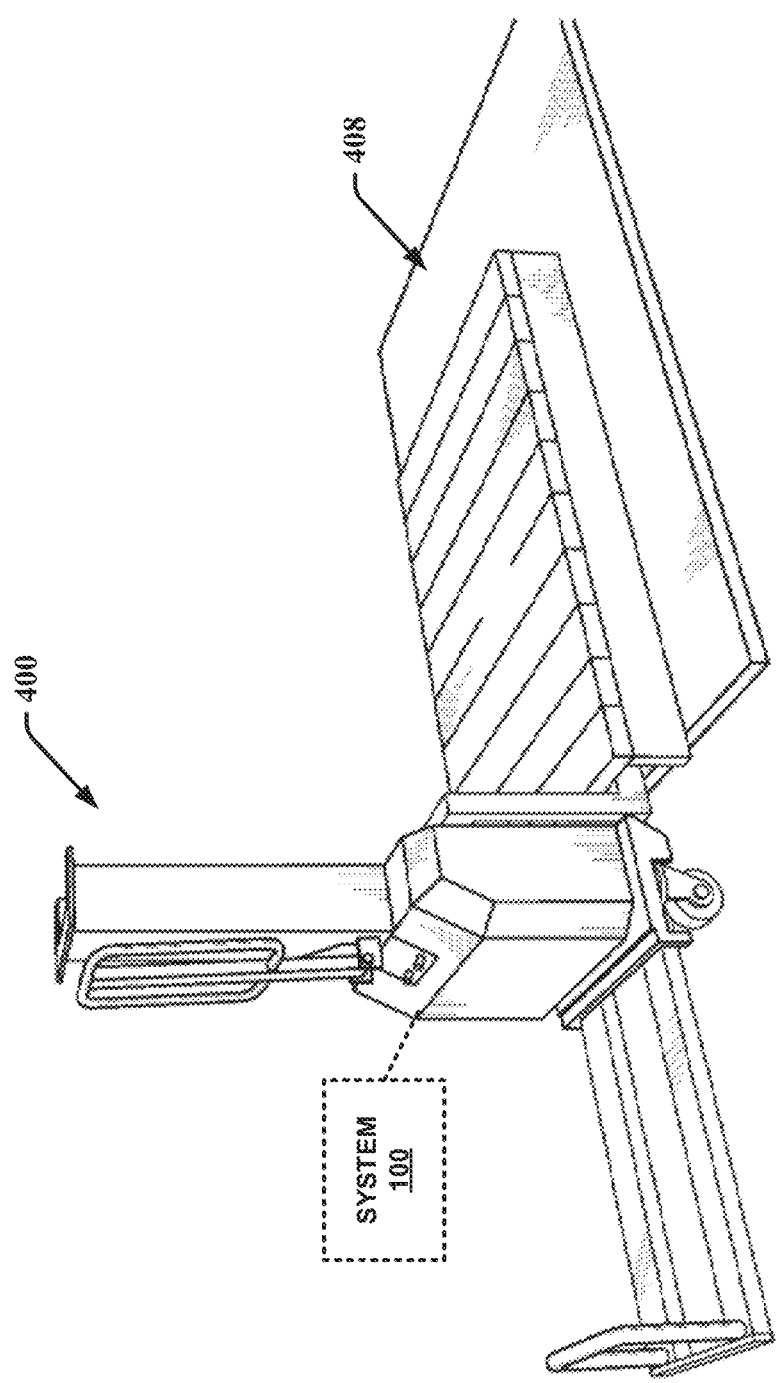
FIG. 8 illustrates yet another example of a non-limiting system that facilitates automation of a self-lifting forklift in accordance with one or more embodiments described herein.

FIG. 8 illustrates another example of a non-limiting system that facilitates automation of a self-lifting forklift in accordance with one or more embodiments described herein. Repetitive description of like elements employed in other embodiments described herein is omitted for sake of brevity. FIG. 8 illustrates the forklift 400 being controlled by the system 100 (or 200 or 300) to self-lift to an elevation coincident with the surface of the flatbed 408. As discussed herein the forklift 400 employs a lifting system 108 to lift itself to a desired elevation.

Figure 9:
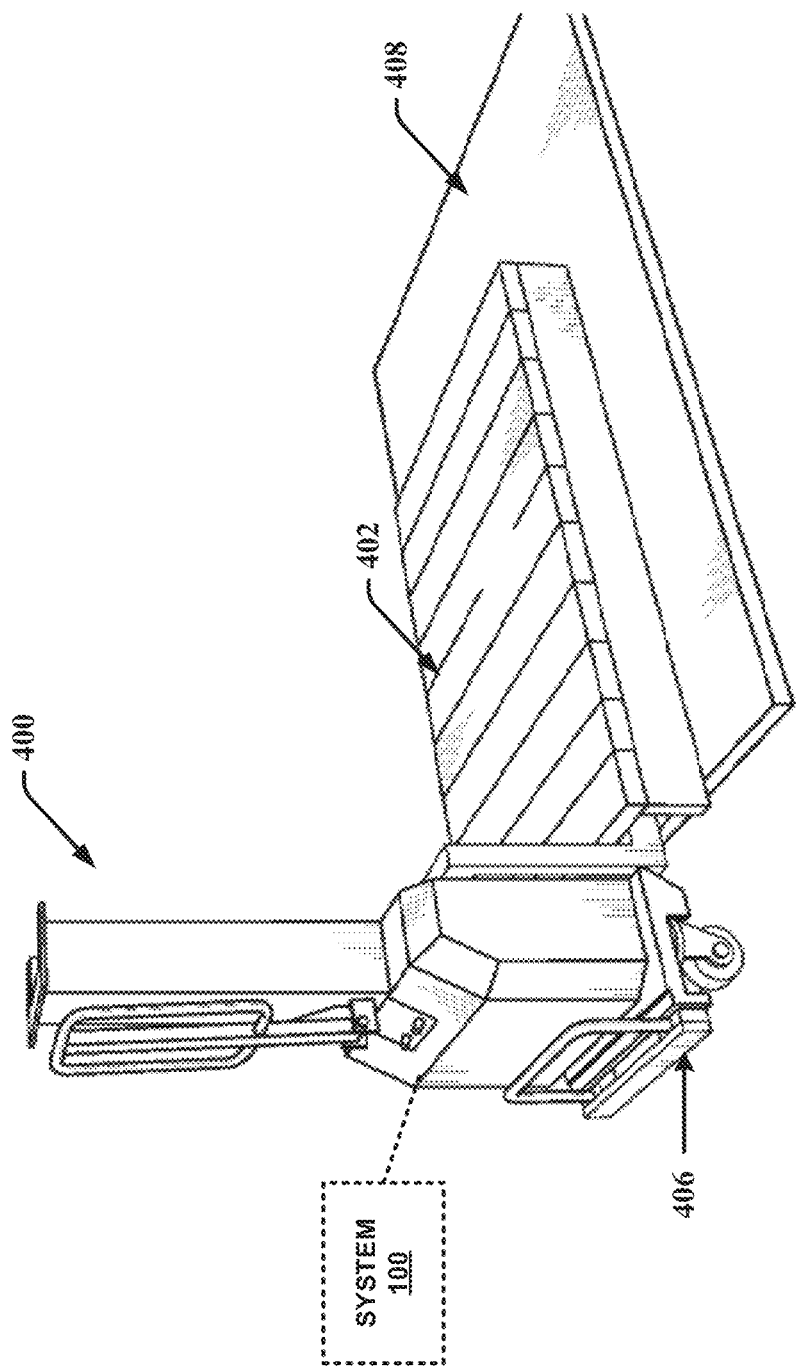
FIG. 9 illustrates yet another example of a non-limiting system that facilitates automation of a self-lifting forklift in accordance with one or more embodiments described herein.

FIG. 9 illustrates another example of a non-limiting system that facilitates automation of a self-lifting forklift in accordance with one or more embodiments described herein. Repetitive description of like elements employed in other embodiments described herein is omitted for sake of brevity. FIG. 9 illustrates the forklift 400 being controlled by the system 100 (or 200 or 300) to be positioned at a desired elevation. The support legs 406 are moved back to their original position in front of the forklift 400 and under the pallet 402.

Figure 10:
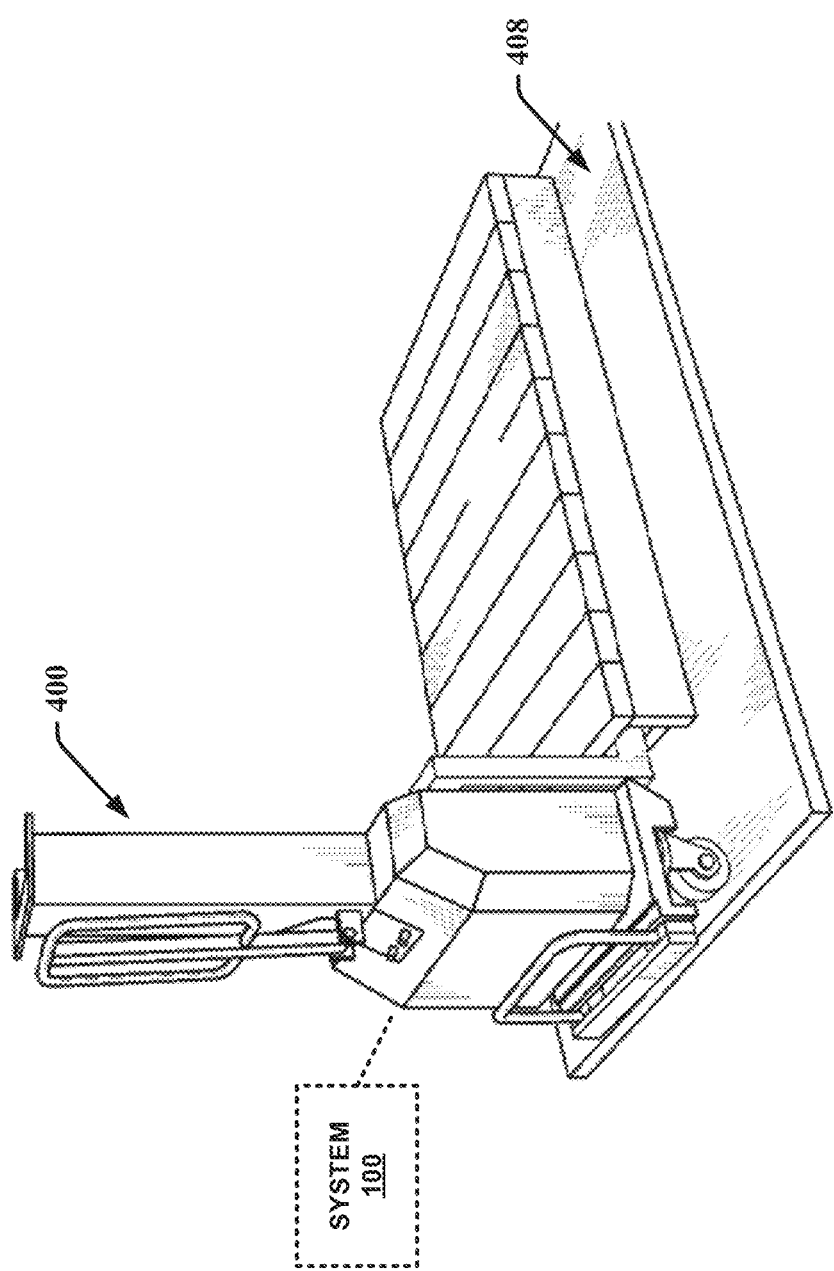
FIG. 10 illustrates yet another example of a non-limiting system that facilitates automation of a self-lifting forklift in accordance with one or more embodiments described herein.

FIG. 10 illustrates another example of a non-limiting system that facilitates automation of a self-lifting forklift in accordance with one or more embodiments described herein. Repetitive description of like elements employed in other embodiments described herein is omitted for sake of brevity. FIG. 10 illustrates the forklift 400 being controlled by the system 100 (or 200 or 300) to be self-positioned at a desired position on the flatbed 408.

Figure 11:
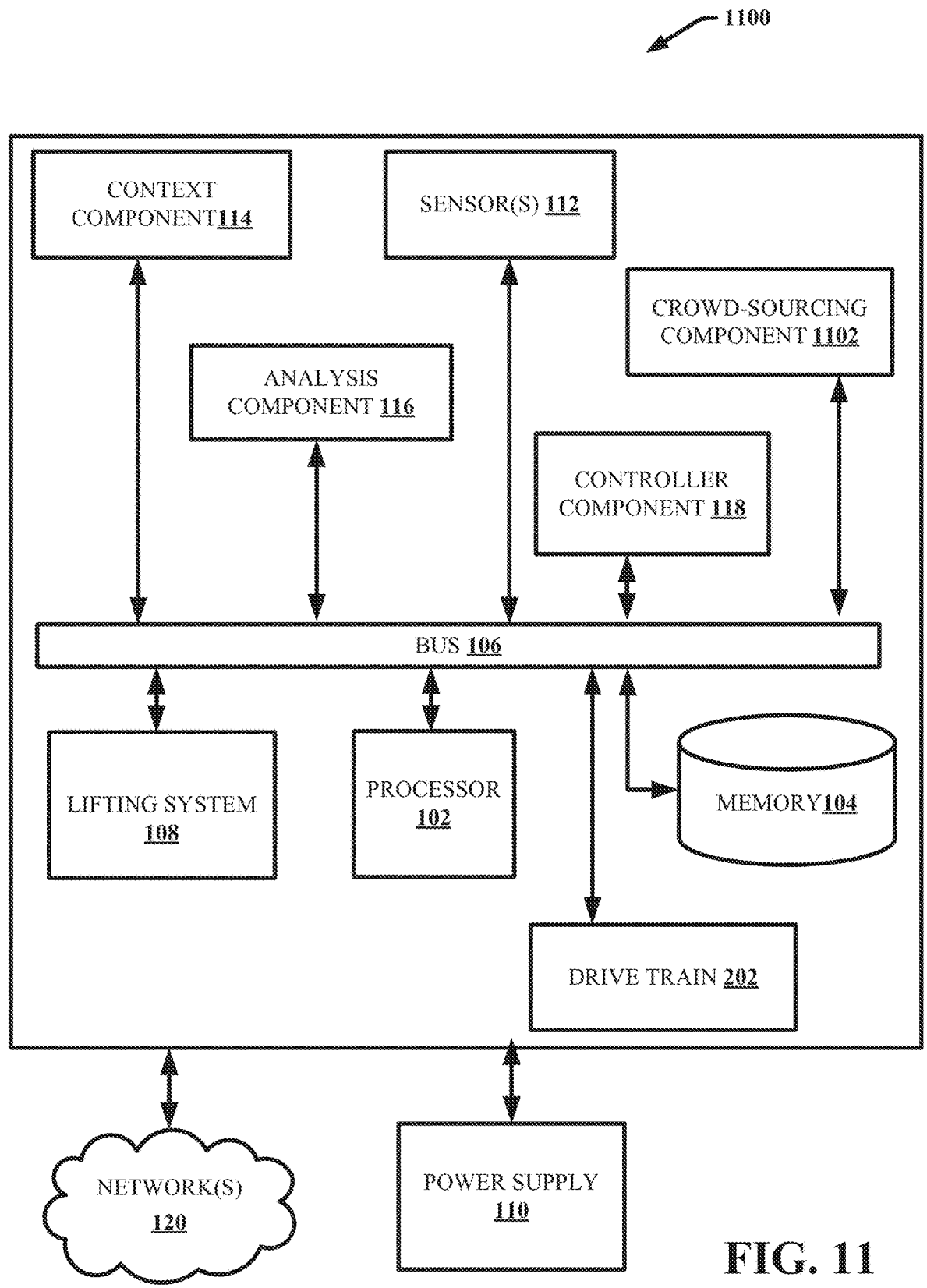
FIG. 11 illustrates a block diagram of yet another example, non-limiting system that facilitates automation of a self-lifting forklift in accordance with one or more embodiments described herein.

FIG. 11 illustrates a block diagram of another example, non-limiting system that facilitates automation of a self-lifting forklift in accordance with one or more embodiments described herein. Repetitive description of like elements employed in other embodiments described herein is omitted for sake of brevity. In certain embodiments, the system 1100 includes a crowdsourcing component 1102 that can facilitate the analysis of information by the analysis component 116 from the plurality of sensors 112 and the context component 114. For example, the crowdsourcing component 1102 can collect information shared by other forklifts regarding surface conditions at or near delivery sites, pedestrian or vehicle traffic, weather information and the like. In one example, the crowdsourcing component 1102 associated with weather conditions that are causing similar forklifts to lose traction at a loading or delivery site.

In another example, the crowdsourcing component 1102 can collect information shared by other forklifts regarding how certain forklift models handle different load weights under various weather, surface or incline positions. Likewise, the crowdsourcing component 1102 can collect information shared by other forklifts regarding wear and tear of certain forklift models.

In another example, the crowdsourcing component 1102 can collect real-time information from other forklifts, delivery vehicles, loading or unloading locations that can affect delivery preferred delivery times as determined by the analysis component 116.

Figure 12:
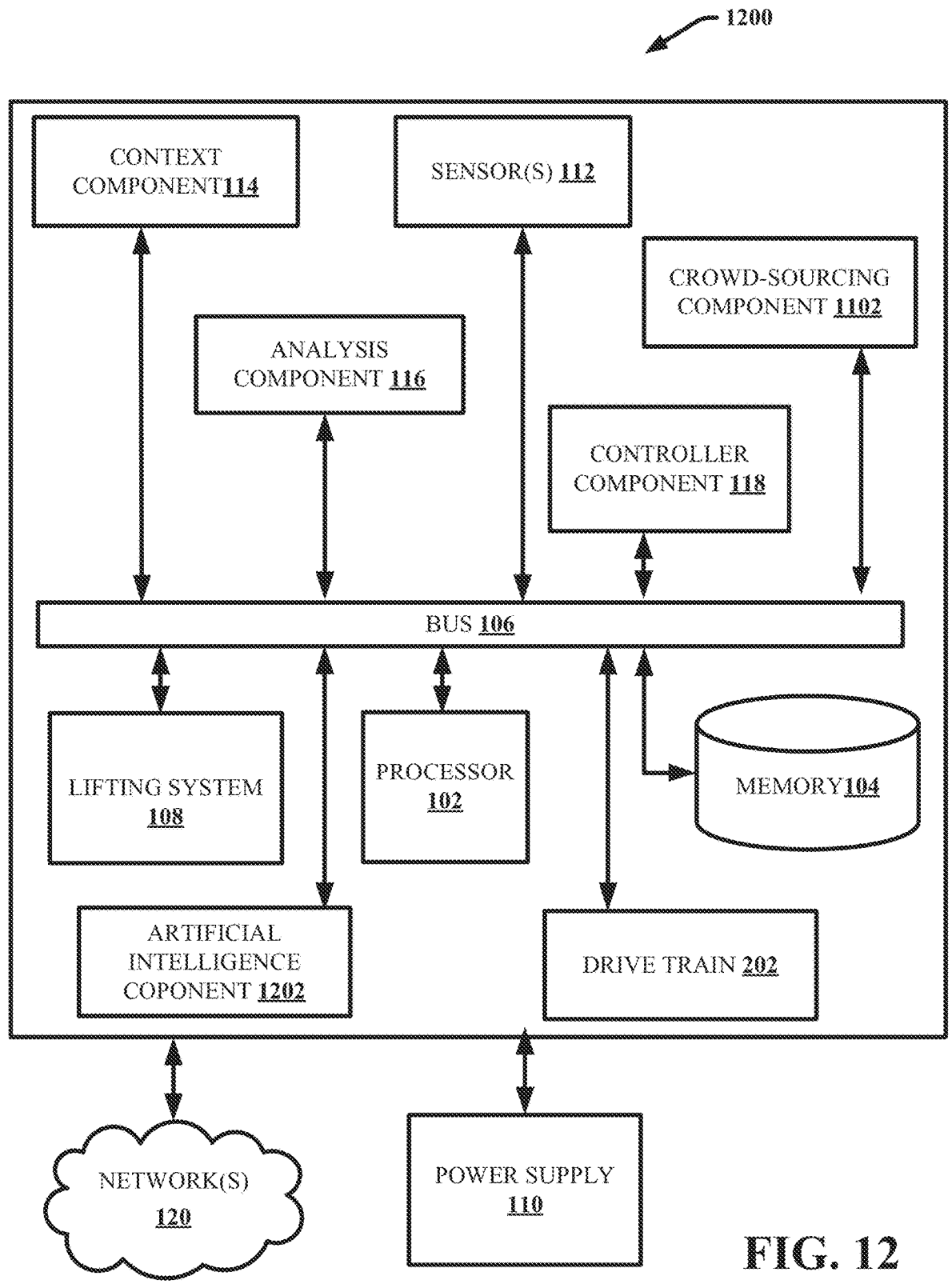
FIG. 12 illustrates a block diagram of yet another example, non-limiting system that facilitates automation of a self-lifting forklift in accordance with one or more embodiments described herein.

FIG. 12 illustrates a block diagram of another example, non-limiting system that facilitates automation of a self-lifting forklift in accordance with one or more embodiments described herein. Repetitive description of like elements employed in other embodiments described herein is omitted for sake of brevity. In certain embodiments, the system 1200 includes an artificial intelligence component 1202 that utilizes machine learning to facilitate the analyzing of information by the analysis component 116 from the plurality of sensors 112 and the context component 114. For example, the artificial intelligence component 1202 can detect patterns associated with how the forklift or similar forklifts perform under various conditions such as load weight, inclines/declines, weather conditions, operator error, wear and tear and the like. For example, the weight guidelines utilized by the analysis component 116 to determine weight or incline/decline limits for pallet loads can be adjusted if the forklift experiences problems at certain weight or incline/decline levels. In another example, the artificial intelligence component 1202 can detect patterns associated with operator error in certain situations, causing the analysis component 116 to adjust recommendations associated with certain operational decisions.

In another example, the artificial intelligence component 1202 can utilize data collected by the crowdsourcing component 1102 that certain components of the forklift such as the braking component will require maintenance much sooner or much later than expected due to actual usage data, thus adjusting maintenance recommendations issued by the analysis component 116.

In this regard, the artificial intelligence component 1202 can perform classifications, correlations, inferences and/or expressions associated with principles of artificial intelligence. For instance, the artificial intelligence component 1202 can employ an automatic classification system and/or an automatic classification. In one example, the artificial intelligence component 1202 can employ a probabilistic and/or statistical-based analysis (e.g., factoring into the analysis utilities and costs) to learn and/or generate inferences. The artificial intelligence component 1202 can employ any suitable machine-learning based techniques, statistical-based techniques and/or probabilistic-based techniques. For example, the artificial intelligence component 1202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 1202 can perform a set of machine learning computations. For example, the artificial intelligence component 1202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 13:
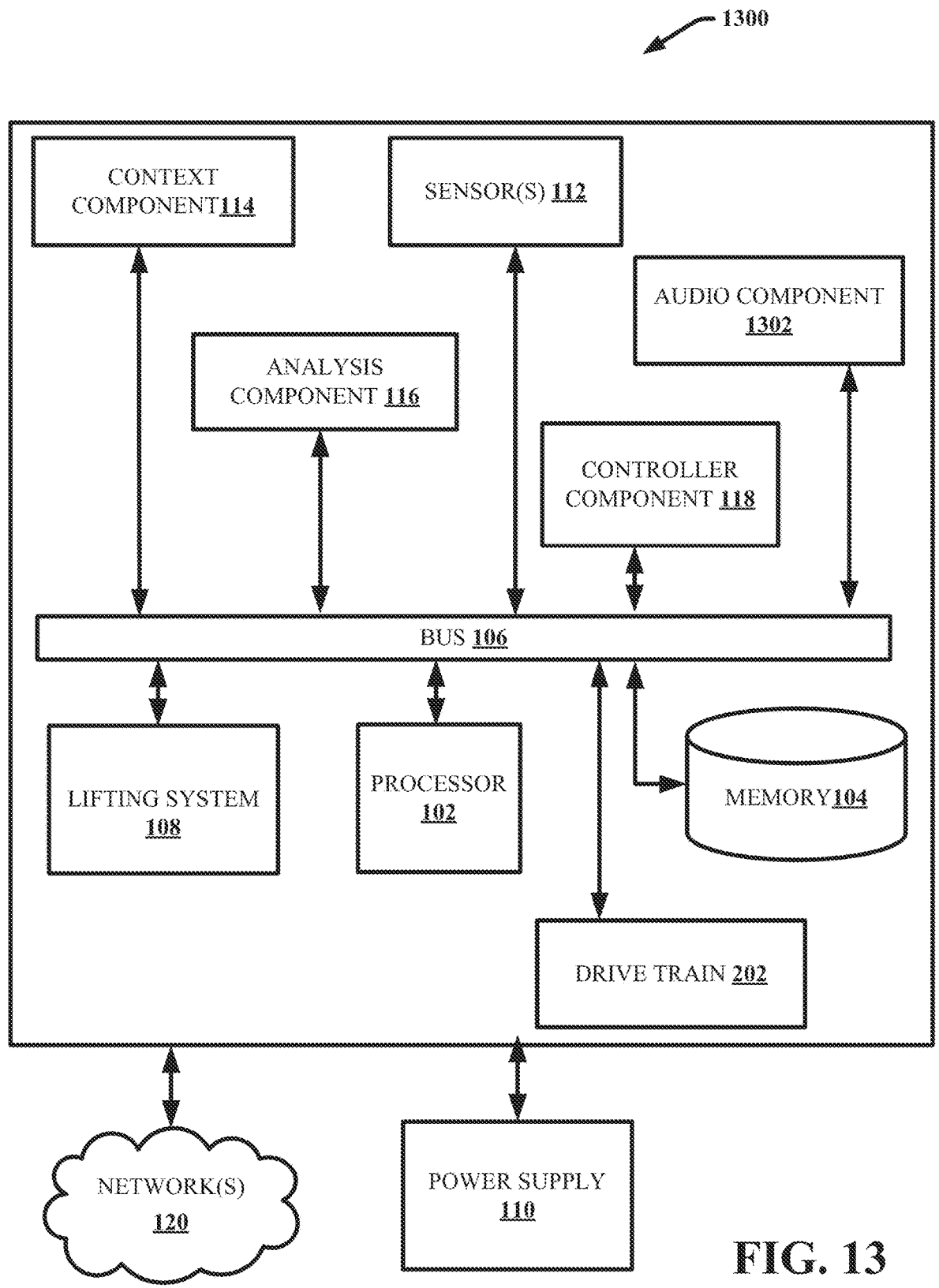
FIG. 13 illustrates a block diagram of yet another example, non-limiting system that facilitates automation of a self-lifting forklift in accordance with one or more embodiments described herein.

FIG. 13 illustrates a block diagram of another example, non-limiting system that facilitates automation of a self-lifting forklift in accordance with one or more embodiments described herein. Repetitive description of like elements employed in other embodiments described herein is omitted for sake of brevity. In certain embodiments, the system 1300 includes an audio component 1302 that facilitates control of the forklift by the control component 118 utilizing voice commands. For example, an operator of the forklift can control operations such as lifting or lowering the forklift and propelling the forklift by using voice commands. The audio component 1302 can employ natural language processing to enable the implementation of voice commands. The control component 118 can provide alerts to the operator if a voice command is unclear and cannot be executed. In another example, profiles of operators compiled by the analysis component 116 can include voice profiles corresponding to operators in order to improve the effectiveness of voice commands given by frequent users of the forklift.

Figure 14:
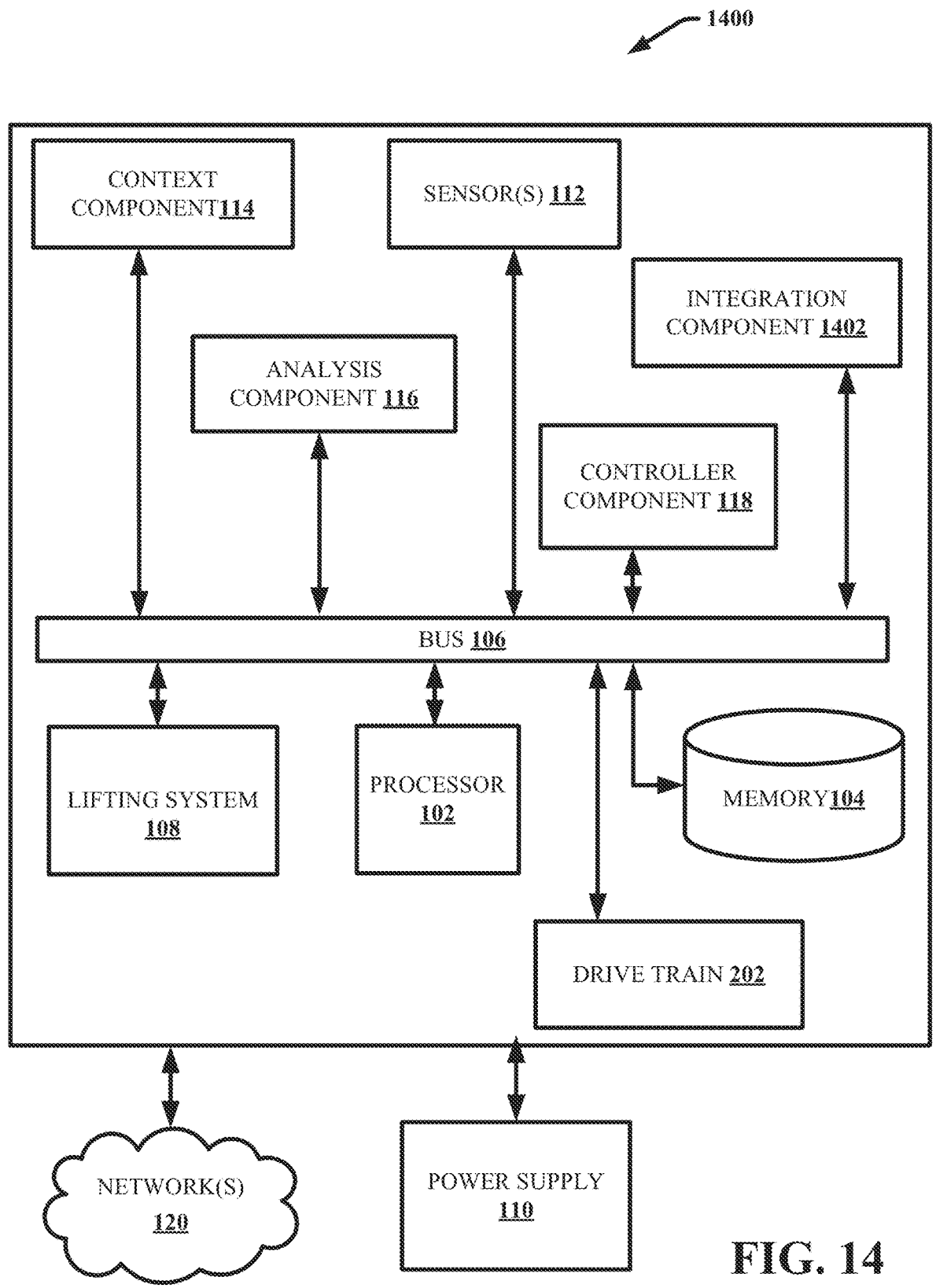
FIG. 14 illustrates yet another example of a non-limiting system that facilitates automation of a self-lifting forklift in accordance with one or more embodiments described herein.

FIG. 14 illustrates a block diagram of another example, non-limiting system that facilitates automation of a self-lifting forklift in accordance with one or more embodiments described herein. Repetitive description of like elements employed in other embodiments described herein is omitted for sake of brevity. In certain embodiments, the system 1400 includes an integration component 1402 that integrates the system 1400 with other devices and systems. For example, the integration component 1402 can enable the forklift to integrate with and communicate with other forklifts, trucks, smart pallets, vans, trucks and other delivery vehicles, carts, robots, drones, warehouse loading docks, garage doors, loading docks of businesses or residences receiving goods and the like. Such communication can enable coordination of factors such as availability of packages for pickup, pickup and delivery times, load capacity within delivery vehicles, matching pallet and load with suitable forklift, etc.

In an embodiment, the integration component 1402 can enable the forklift to communicate with smart pallets that are equipped with sensors and communication components so that the forklift and pallets can work in tandem in connection with moving a palletized or un-palletized load or loading or unloading the pallet. For example, the smart pallet can broadcast its location and orientation to the forklift. In another embodiment, the pallet can broadcast weight of its load or even details of the load to the forklift. Likewise, the integration component 1402 can enable the forklift to communicate with other equipment in similar fashion to facilitate autonomous or semi-autonomous operation of the forklift in connection with load transport.

In an embodiment, the integration component 1402 can enable the forklift to communicate with a retrofit rail pallet moving system that can be placed in a shipping container to facilitate moving pallets within the container. In an embodiment, a conveyor system is used to allow for the pallets to be moved along the conveyor. The conveyor can be powered in an embodiment. In another embodiment, a linear motor system can be used to move the pallets. In another embodiment, a rail or track system with positionable and/or telescopic forks can be employed to move pallets within the container. This retrofit system can communicate and interact with the forklift.

In an embodiment, the integration component 1402 can enable the forklift to communicate with a loading dock. In an embodiment, the control component 118 can employ a queuing system to facilitate task management (e.g., pre-signals to dock, charging, scheduling, workload, load balancing of work, weight determination, knowing which truck to unload first).

In an embodiment, the forklift can interact with other forklifts. For example, a large or heavy load may require more than one forklift for transportation. In this example, one or more forklifts can coordinate to transport the load. In cases of uneven weight distribution within the load, each forklift's sensors can determine weight distribution and adjust accordingly as the load is transported.

In an embodiment, the forklift can interact with a stacker.

In an embodiment, the forklift can communicate with a garage door opener to facilitate entering and exiting of a garage and delivery of packages.

In an embodiment, the forklift can communicate with a lift gate (safety—knowing whether it's safely engaged) for safe hand-off.

Figure 15:
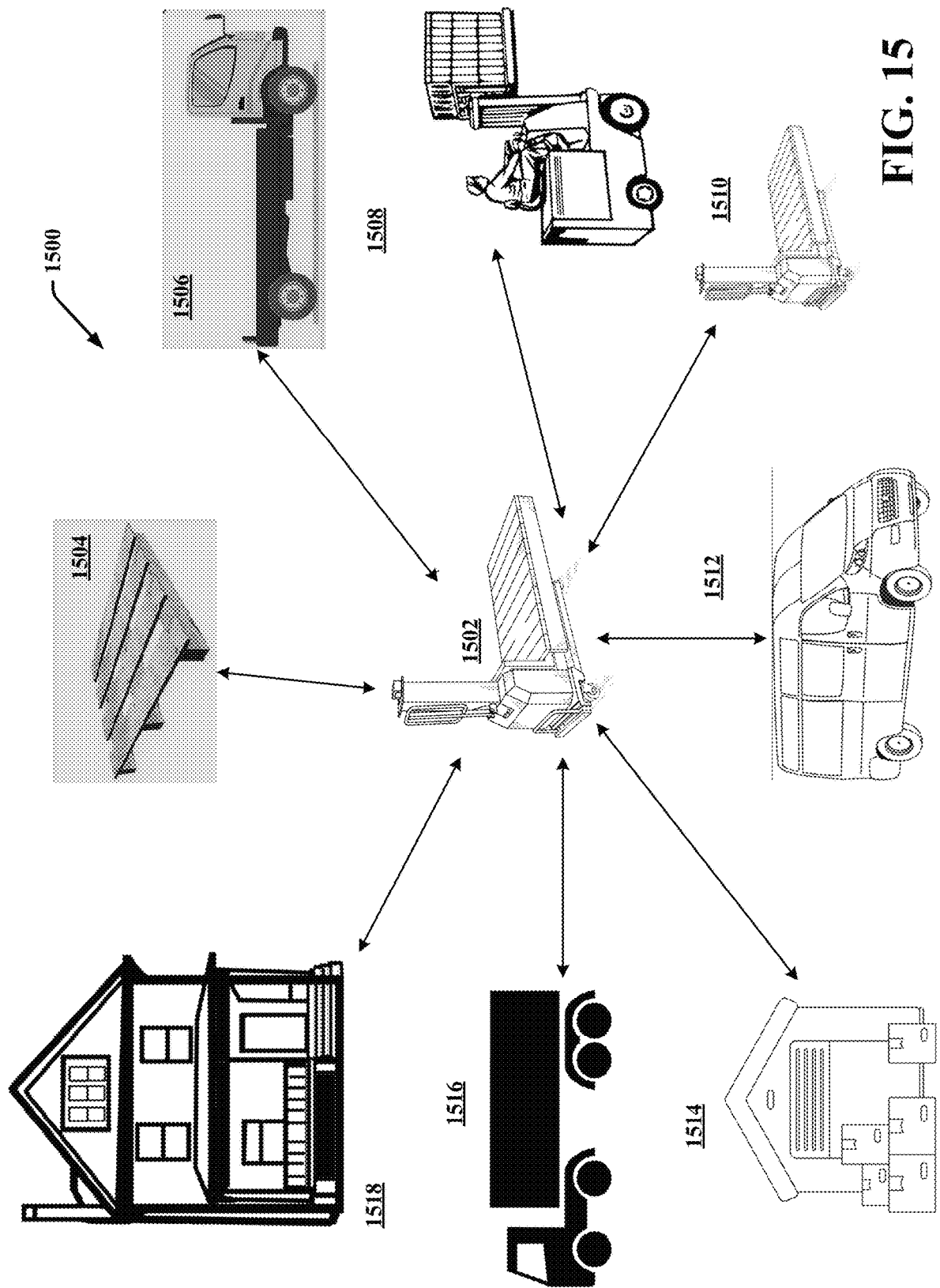
FIG. 15 illustrates yet another example of a non-limiting system that facilitates automation of a self-lifting forklift in accordance with one or more embodiments described herein.

FIG. 15 illustrates yet another example of a non-limiting system that facilitates automation of a self-lifting forklift in accordance with one or more embodiments described herein. Repetitive description of like elements employed in other embodiments described herein is omitted for sake of brevity. FIG. 15 depicts an example 1500 of system 1400 that enables the self-lifting forklift 1502 to integrate with and communicate with other devices and systems. This example depicts the forklift 1502 integrated with a smart pallet 1504, a flatbed truck 1506, a conventional forklift 1508, another self-lifting forklift 1510, a van 1512, a warehouse 1514, a large truck 1516 and a garage door of a residence 1518. FIG. 15 illustrates how a fully automated and fully autonomous embodiment of the self-lifting forklift 1502 can complete its task without requiring direct human involvement. For example, for an order to be delivered to a residence, the self-lifting forklift 1502 can communicate with the smart pallet 1504, the forklift 1508 and/or the warehouse 1512 to coordinate pickup time and location. The self-lifting forklift 1502 can coordinate with the flatbed truck 1506, the van 1510 or the large truck 1514 for transportation to the pickup location at the pickup time. The self-lifting forklift 1502 with autonomous capability does not require direct human operation to lower itself from the delivery vehicle and then transport itself to the location of the delivery item. The self-lifting forklift 1502 can then retrieve the pallet 1504 with the delivery item and then load it onto the delivery vehicle which can transport the self-lifting forklift 1502 with the pallet. At this point the self-lifting forklift 1502 can communicate with the garage door of the residence 1518 where the package is scheduled to be delivered. Upon arrival at the residence, the self-lifting forklift 1502 can lower itself with the pallet 1504 onto the pavement and then deliver the pallet 1504 into the garage by coordinating with the garage door 1518 which can authenticate the self-lifting forklift 1502 and the pallet 1504 and permit entry. In another example, the self-lifting forklift 1502 can communicate with one or more other self-lifting forklifts 1510 to coordinate and complete loading, transportation, delivery and unloading tasks.

Figure 16:
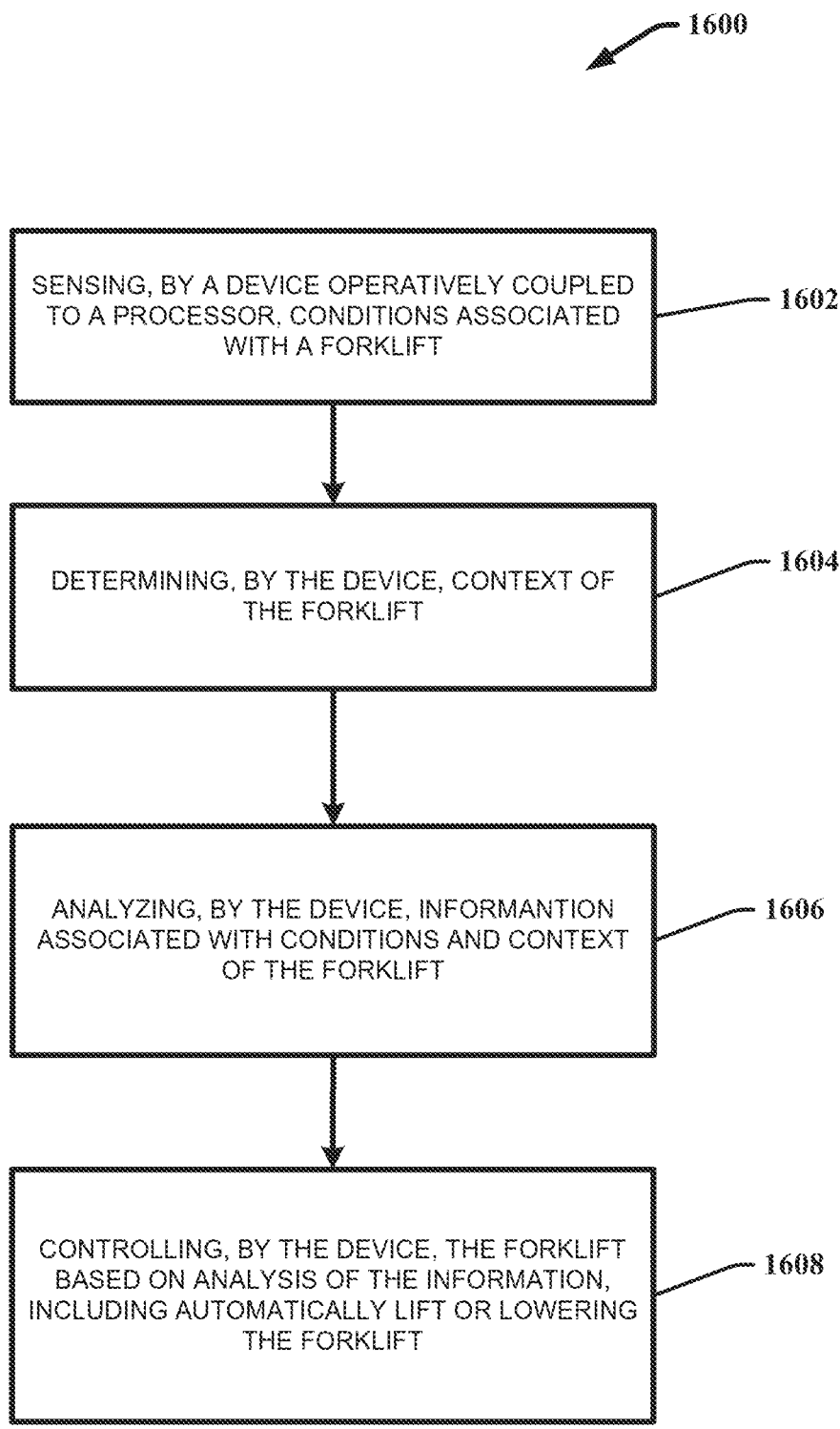
FIG. 16 illustrates a flow diagram of an example of a method to facilitate automation of a self-lifting forklift in accordance with one or more embodiments described herein.

FIG. 16 illustrates a flow diagram of an example of a method to facilitate automation of a self-lifting forklift in accordance with one or more embodiments described herein. Repetitive description of like elements employed in other embodiments described herein is omitted for sake of brevity. 1602 represents a first act that includes sensing conditions associated with a forklift (e.g., via the sensors 112). At 1604, context of the forklift is determined (e.g., via the context component 114). At 1606, information associated with conditions and context of the forklift is analyzed (e.g., via the analysis component 116). At 1608, the forklift is controlled based on analysis of the information analyzed at 1604, including automatically lifting or lowering of the forklift (e.g., via the control component 118).

In certain embodiments, at 1608, the forklift is controlled based on analysis of the information analyzed at 1604, including self-propelling the forklift (e.g., via the control component 118). In another embodiment, at 1608, control of the forklift is visually represented to facilitate control of the forklift.

Figure 17:
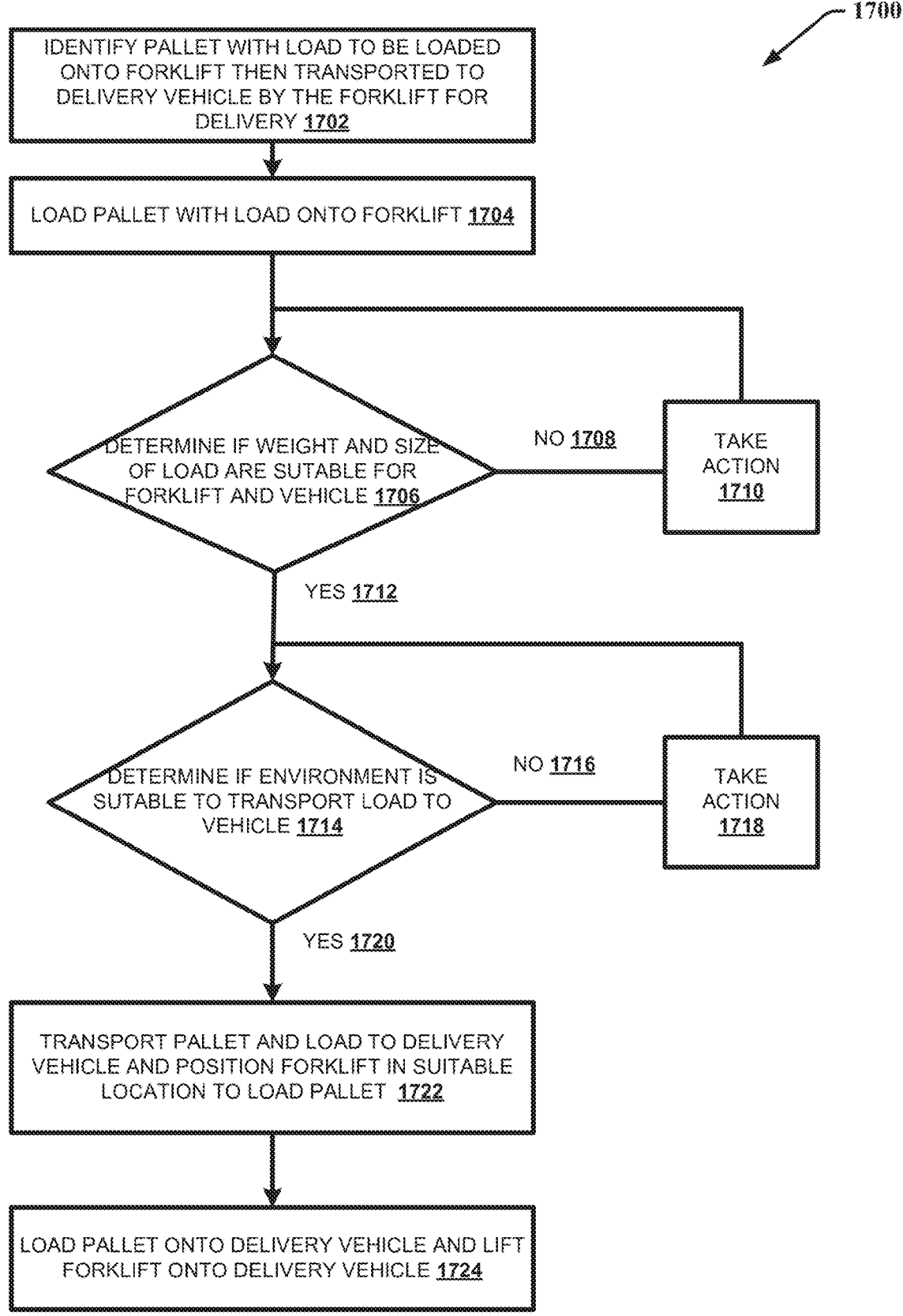
FIG. 17 illustrates another flow diagram of an example of a method to facilitate automation of a self-lifting forklift in accordance with one or more embodiments described herein.

FIG. 17 illustrates another basic method flow diagram 1700 of functional acts within various embodiments. Repetitive description of like elements employed in other embodiments described herein is omitted for sake of brevity. The method to facilitate automation of a self-lifting forklift illustrated in FIG. 17 can be implemented in the system 100 of FIG. 1. As such, reference is to be made to the example of FIG. 1 in the following discussion of the example of FIG. 17.

Thus, in the example of FIG. 17, a sequence to facilitate automation of a self-lifting forklift 1700 is outlined. The sequence begins at 1702 where a pallet with a load to be loaded and then transported to a delivery vehicle by the forklift for delivery is identified. At 1704, the pallet with the load is loaded onto the forklift. At 1706, it is determined if the weight and size of the load are suitable for the forklift and the delivery vehicle. For example, the weight of the load may exceed the safety limit of the forklift, or the size of the load may be too large for the delivery vehicle. If either the weight or size of the load is not suitable for the forklift or the delivery vehicle 1708, then remediation is required. For example, the load on the pallet can be separated and placed on two pallets. Once action is taken 1710 to remediate, step 1706 is repeated. If the weight and size of the load are both suitable 1712, then at 1714 it is determined if the environment is suitable for the forklift to transport the pallet and the load to the delivery vehicle. For example, the condition of the surface of the path for transportation may be too muddy or too slippery, or there may be obstructions. If the environment is not suitable 1716, remediation is required. In one example, an alternate path to the delivery vehicle can be selected. In another example, transportation to the delivery vehicle can be delayed. Once action is taken 1718 to remediate, step 1714 is repeated. If the environment is suitable 1720, then the pallet and load is transported to the delivery vehicle and the forklift is positioned in a suitable location to load the pallet onto the delivery vehicle 1722. At 1724, the pallet is loaded onto the delivery vehicle and the forklift is lifted onto the delivery vehicle.

Figure 18:
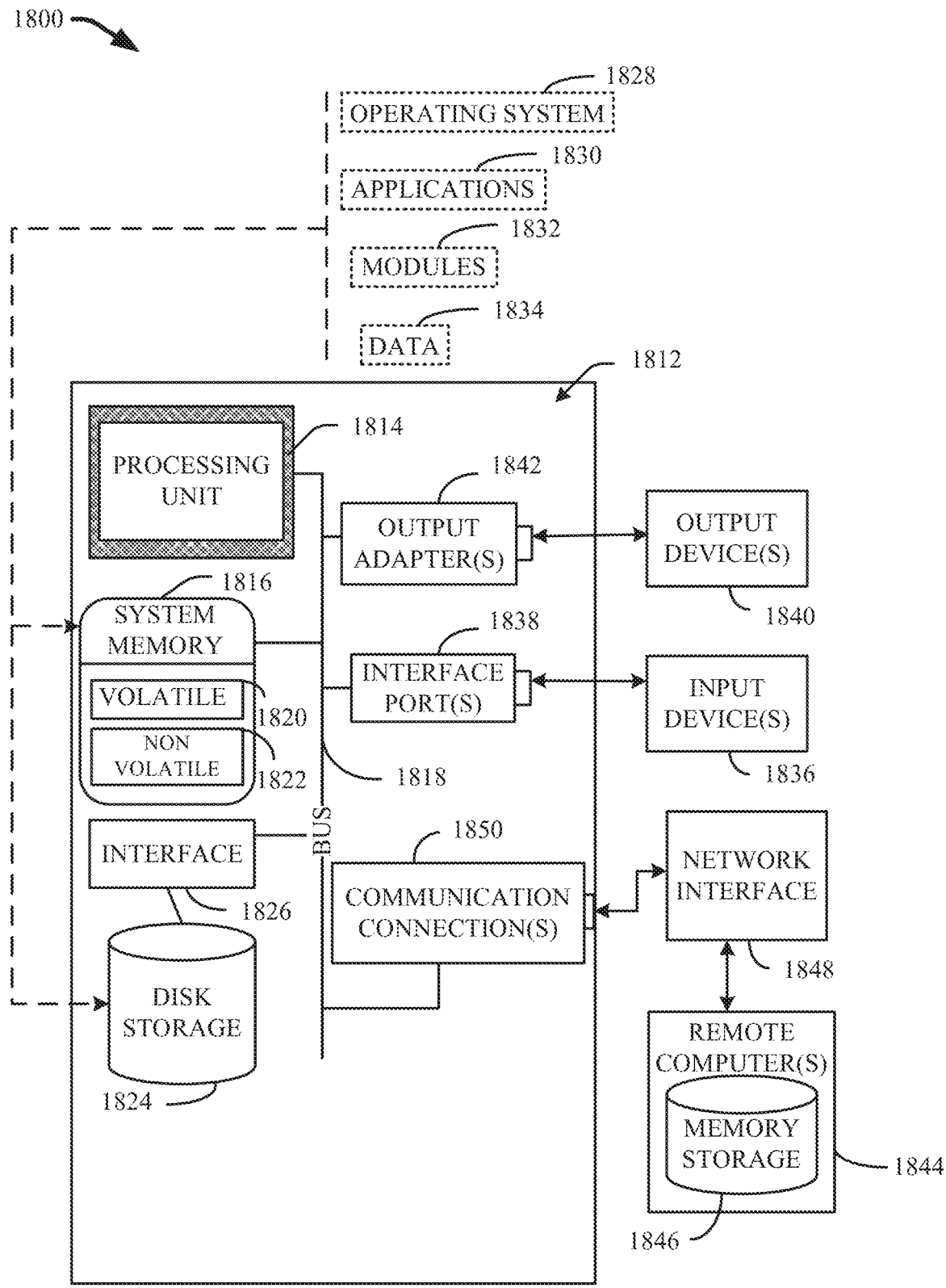
FIG. 18 illustrates a block diagram of an example, non-limiting operating environment in accordance with one or more implementations described herein.

In order to provide a context for the various aspects of the disclosed subject matter, FIG. 18 as well as the following discussion are intended to provide a general description of a suitable environment in which the various aspects of the disclosed subject matter can be implemented. FIG. 18 illustrates a block diagram of an example, non-limiting operating environment in which one or more embodiments described herein can be facilitated. Repetitive description of like elements employed in other embodiments described herein is omitted for sake of brevity.

With reference to FIG. 18, a suitable operating environment 1800 for implementing various aspects of this disclosure can also include a computer 1812. The computer 1812 can also include a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814. The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1816 can also include volatile memory 1820 and non-volatile memory 1822. The basic input/output system (BIOS), containing the basic routines to transfer information between elements within the computer 1812, such as during start-up, is stored in non-volatile memory 1822. Computer 1812 can also include removable/non-removable, volatile/non-volatile computer storage media. FIG. 18 illustrates, for example, a disk storage 1824. Disk storage 1824 can also include, but is not limited to, devices like a magnetic disk drive, floppy disk drive, tape drive, Jaz drive, Zip drive, LS-100 drive, flash memory card, or memory stick. The disk storage 1824 also can include storage media separately or in combination with other storage media. To facilitate connection of the disk storage 1824 to the system bus 1818, a removable or non-removable interface is typically used, such as interface 1826. FIG. 18 also depicts software that acts as an intermediary between users and the basic computer resources described in the suitable operating environment 1800. Such software can also include, for example, an operating system 1828. Operating system 1828, which can be stored on disk storage 1824, acts to control and allocate resources of the computer 1812.

System applications 1830 take advantage of the management of resources by operating system 1828 through program modules 1832 and program data 1834, e.g., stored either in system memory 1816 or on disk storage 1824. It is to be appreciated that this disclosure can be implemented with various operating systems or combinations of operating systems. A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port can be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a computer, a server, a router, a network PC, a workstation, a microprocessor-based appliance, a peer device or other common network node and the like, and typically can also include many or all of the elements described relative to computer 1812. For purposes of brevity, only a memory storage device 746 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1850 refers to the hardware/software employed to connect the network interface 1848 to the system bus 1818. While communication connection 1850 is shown for illustrative clarity inside computer 1812, it can also be external to computer 1812. The hardware/software for connection to the network interface 1848 can also include, for exemplary purposes only, internal and external technologies such as, modems including regular telephone grade modems, cable modems and DSL modems, ISDN adapters, and Ethernet cards.

Figure 19:
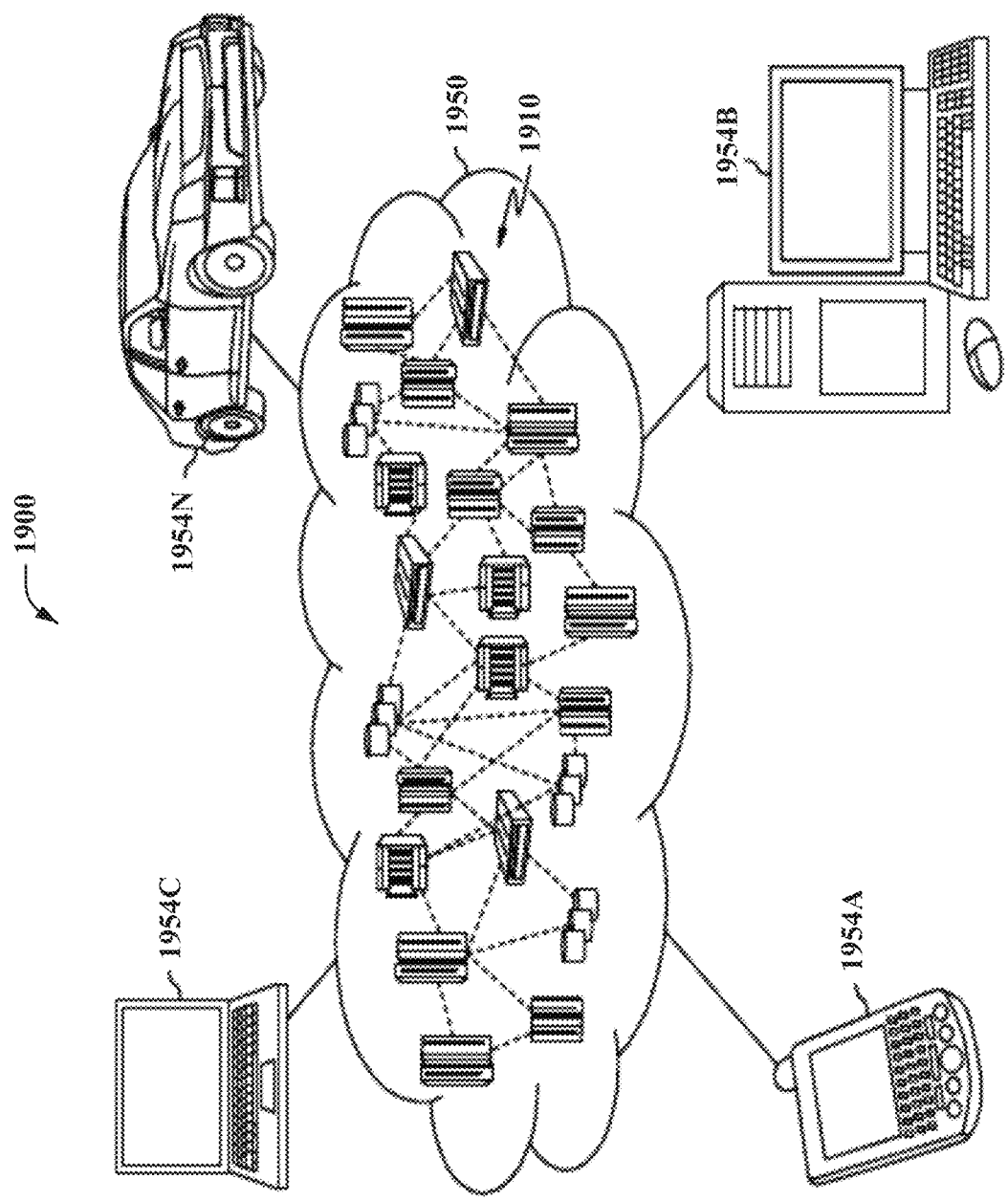
FIG. 19 illustrates a block diagram of an example, non-limiting cloud computing environment in accordance with one or more implementations described herein.

Referring now to FIG. 19, an illustrative cloud computing environment 1950 is depicted. As shown, cloud computing environment 1950 includes one or more cloud computing nodes 1910 with which local computing devices used by cloud consumers, such as, for example, personal digital assistant (PDA) or cellular telephone 1954A, desktop computer 1954B, laptop computer 1954C, and/or automobile computer system 1954N may communicate. Although not illustrated in FIG. 19, cloud computing nodes 1910 can further comprise a quantum platform (e.g., quantum computer, quantum hardware, quantum software, etc.) with which local computing devices used by cloud consumers can communicate. Nodes 1910 may communicate with one another. They may be grouped (not shown) physically or virtually, in one or more networks, such as Private, Community, Public, or Hybrid clouds as described hereinabove, or a combination thereof. This allows cloud computing environment 1950 to offer infrastructure, platforms and/or software as services for which a cloud consumer does not need to maintain resources on a local computing device. It is understood that the types of computing devices 1954A-N shown in FIG. 19 are intended to be illustrative only and that computing nodes 1910 and cloud computing environment 1950 can communicate with any type of computerized device over any type of network and/or network addressable connection (e.g., using a web browser).

Figure 20:
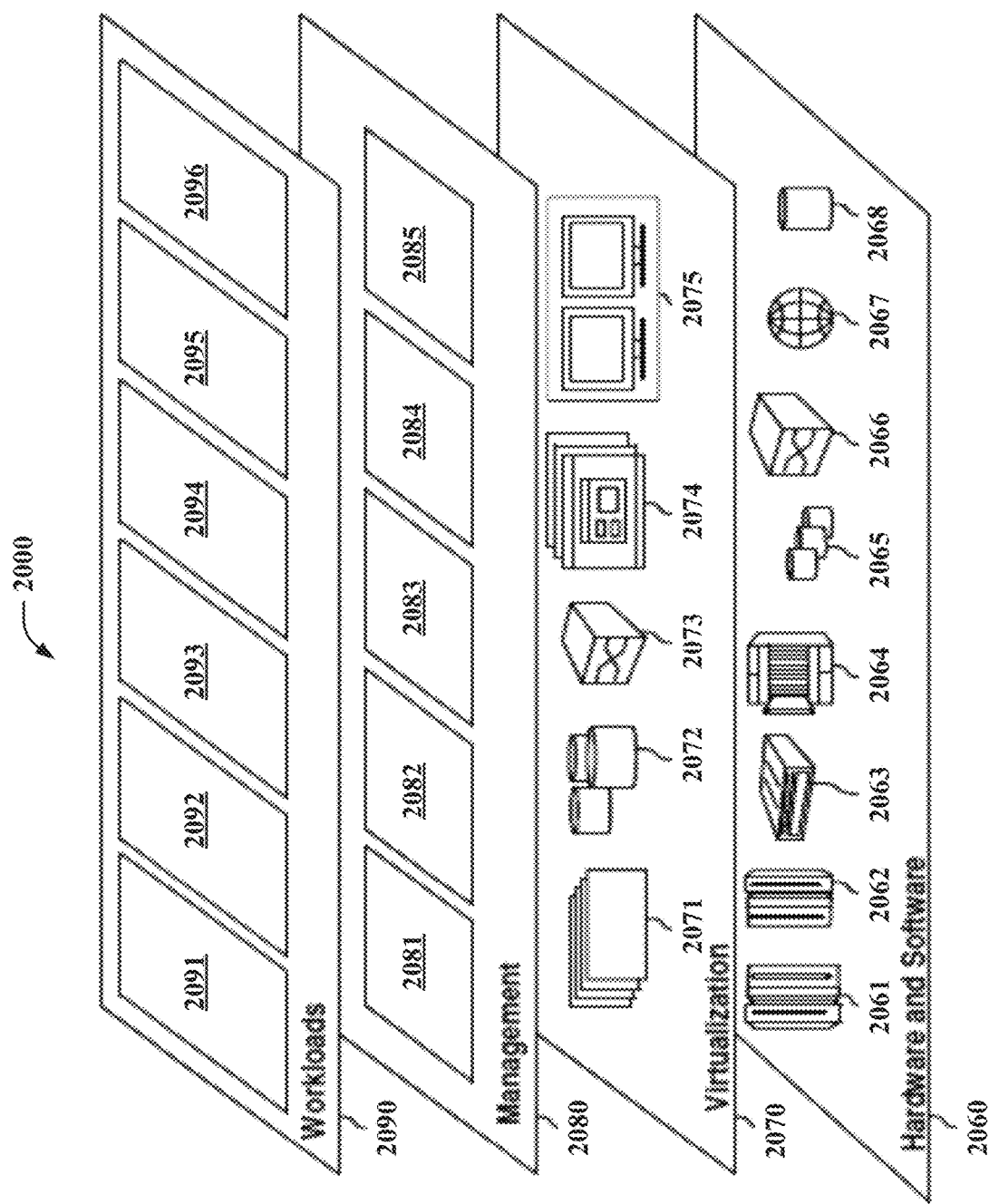
FIG. 20 illustrates a block diagram of example, non-limiting abstraction model layers in accordance with one or more implementations described herein.

Referring now to FIG. 20, a set of functional abstraction layers provided by cloud computing environment 1950 (FIG. 19) is shown. It should be understood in advance that the components, layers, and functions shown in FIG. 20 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture-based servers 2062; servers 2063; blade servers 2064; storage devices 2065; and networks and networking components 2066. In some embodiments, software components include network application server software 2067, quantum platform routing software 2068, and/or quantum software (not illustrated in FIG. 20).

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Non-limiting examples of workloads and functions which may be provided from this layer include: mapping and navigation 2091; software development and lifecycle management 2092; virtual classroom education delivery 2093; data analytics processing 2094; transaction processing 2095; and quantum state preparation software 2096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or non-volatile memory, or can include both volatile and non-volatile memory. By way of illustration, and not limitation, non-volatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system located on or within a forklift, comprising:
 a lifting system that provides for vertically lifting or lowering the forklift;
 a power supply;
 a memory storing one or more computer readable and executable components; and
 a processor operably coupled to the memory and that executes the computer readable and executable components stored in the memory and that is operably coupled to:
  a plurality of sensors that sense conditions associated with the forklift, wherein the plurality of sensors include machine vision;

a context component that determines context of the forklift, wherein the context of the forklift comprises extrinsic data that can affect intended use of the forklift;
an analysis component that analyzes information from the plurality of sensors and the context component;
an artificial intelligence component that utilizes machine learning to facilitate the analyzing of the information from the plurality of sensors and the context component to detect patterns associated with how the forklift or similar forklifts perform under various conditions and adjust output from the analysis component based on the patterns; and
a control component that controls the forklift based on output from the analysis component and adjustments by the artificial intelligence component, wherein the control includes automatically lifting or lowering of the forklift, and wherein the control component provides for self-navigation of the forklift based at least in part on analysis of machine vision information.

2. A system located on or within a forklift, comprising:
a lifting system that provides for vertically lifting or lowering the forklift;
a power supply;
a drive train for self-propelling the forklift;
a memory storing one or more computer readable and executable components; and
a processor operably coupled to the memory and that executes the computer readable and executable components stored in the memory and that is operably coupled to:
a plurality of sensors that sense conditions associated with the forklift;
a context component that determines context of the forklift, wherein the context of the forklift comprises extrinsic data that can affect intended use of the forklift;
an analysis component that analyzes information from the plurality of sensors and the context component;
an artificial intelligence component that utilizes machine learning to facilitate the analyzing of the information from the plurality of sensors and the context component to detect patterns associated with how the forklift or similar forklifts perform under various conditions and adjust output from the analysis component based on the patterns; and
a control component that controls the forklift based on output from the analysis component and adjustments by the artificial intelligence component, wherein the control includes automatically lifting or lowering of the forklift or self-propelling the forklift, and wherein the control component provides for self-navigation of the forklift based at least in part on analysis of machine vision information.

3. The system of claim 2, wherein the forklift comprises a self-lifting forklift.

4. The system of claim 2, further comprising an interactive display component that visually represents the control of the forklift by the control component.

5. The system of claim 4, wherein the interactive display component comprises at least one of an augmented reality component or a virtual reality component.

6. The system of claim 2, wherein the analysis component employs crowdsourcing to facilitate the analyzing of the information from the plurality of sensors and the context component.

7. The system of claim 2, further comprising an integration component that integrates the system with other devices and systems.

8. The system of claim 7, whereby the integration component can communicate with an integration component of a second forklift.

9. The system of claim 2, further comprising an audio component that facilitates control of the forklift by the control component utilizing voice commands.

10. A computer-implemented method comprising:
sensing, by a device operatively coupled to a processor, conditions associated with a forklift;
determining, by the device, context of the forklift;
analyzing, by the device, information associated with the conditions and the context of the forklift, wherein the context of the forklift comprises extrinsic data that can affect intended use of the forklift;
utilizing machine learning to facilitate analyzing of information and detecting patterns associated with how the forklift or similar forklifts perform under various conditions and adjusting the analysis based on the patterns; and
controlling, by the device, the forklift based on analysis of the information and adjustments based on the detected patterns, including automatically lifting or lowering of the forklift, and providing for self-navigation of the forklift based at least in part on analysis of machine vision information.

11. The method of claim 10, further comprising controlling by the device, the forklift by self-propelling the forklift.

12. The method of claim 11, further comprising visually representing the control of the forklift to facilitate the control of the forklift.

13. The method of claim 12, further comprising utilizing augmented reality or virtual reality to visually represent the control of the forklift and facilitate the control of the forklift.

14. The method of claim 11, further comprising employing crowdsourcing to facilitate the analysis of the information associated with the conditions and the context of the forklift.

15. The method of claim 14, further comprising utilizing artificial intelligence to facilitate the analysis of the information associated with the conditions and the context of the forklift.

16. The method of claim 11, further comprising utilizing voice commands to facilitate control of the forklift.

17. A computer program product comprising a computer readable storage medium having program instructions embodied therewith, the program instructions are executable by a processor to cause the processor to:
sense, by the processor, conditions associated with a forklift;
determine, by the processor, context of the forklift;
analyze, by the processor, information associated with the conditions and the context of the forklift, wherein the context of the forklift comprises extrinsic data that can affect intended use of the forklift;
utilizing machine learning to facilitate analyzing of information and detecting patterns associated with how the forklift or similar forklifts perform under various conditions and adjusting the analysis based on the patterns; and
control, by the processor, the forklift based on analysis of the information and adjustments based on the detected patterns, including automatically lifting or lowering of the forklift, and providing for self-navigation of the forklift based at least in part on analysis of machine vision information.

18. The computer program product of claim 17, further comprising causing the processor to control the forklift by self-propelling the forklift.

19. The computer program product of claim 18, further comprising causing the processor to generate a visual representation of the control of the forklift.

20. A system located on or within a forklift, comprising:
- a lifting system that provides for vertically lifting or lowering the forklift;
- a power supply;
- a memory storing one or more computer readable and executable components; and
- a processor operably coupled to the memory and that executes the computer readable and executable components stored in the memory and that is operably coupled to:
  - a plurality of sensors that sense conditions associated with the forklift, wherein the plurality of sensors include machine vision;
  - a context component that determines context of the forklift, wherein the context of the forklift comprises extrinsic data that can affect intended use of forklift;
  - an analysis component that analyzes information from the plurality of sensors and the context component; and
  - a control component that controls the forklift based on output of the analysis component and a preset configuration for ideal lift points for the forklift corresponding to various types of trucks and vehicles to automatically lift or lower the forklift.

\* \* \* \* \*